US012558791B1

(12) United States Patent
Bernards et al.

(10) Patent No.: US 12,558,791 B1
(45) Date of Patent: Feb. 24, 2026

(54) LIDAR SENSORS OF LEGGED ROBOTS AND RELATED TECHNOLOGY

(71) Applicant: Agility Robotics, Inc., Pittsburgh, PA (US)

(72) Inventors: Mitchell Bernards, Lake Oswego, OR (US); Todd Lewis, Pittsburgh, PA (US); Stefan Klein, Portland, OR (US)

(73) Assignee: Agility Robotics, Inc., Salem, OR (US)

( * ) Notice: Subject to any disclaimer, the term of this patent is extended or adjusted under 35 U.S.C. 154(b) by 548 days.

(21) Appl. No.: 18/163,696

(22) Filed: Feb. 2, 2023

Related U.S. Application Data

(60) Provisional application No. 63/482,008, filed on Jan. 27, 2023.

(51) Int. Cl.
| | |
|---|---|
| *B25J 9/16* | (2006.01) |
| *B25J 9/00* | (2006.01) |
| *B25J 19/00* | (2006.01) |
| *B62D 57/032* | (2006.01) |
| *G01S 17/88* | (2006.01) |
| *G05D 1/00* | (2024.01) |
| *G06T 1/00* | (2006.01) |

(52) U.S. Cl.
CPC ........... *B25J 9/1697* (2013.01); *B25J 9/0009* (2013.01); *B25J 9/162* (2013.01); *B25J 19/0029* (2013.01); *B62D 57/032* (2013.01); *G01S 17/88* (2013.01); *G05D 1/02* (2013.01); *G06T 1/0014* (2013.01)

(58) Field of Classification Search
CPC ........ B25J 9/1697; B25J 9/0009; B25J 9/162; B25J 19/0029; B62D 57/032; G01S 17/88; G05D 1/02; G06T 1/0014
See application file for complete search history.

(56) References Cited

U.S. PATENT DOCUMENTS

| | | | | |
|---|---|---|---|---|
| 7,337,040 B2 * | 2/2008 | Takenaka | ............. | G01C 21/185 |
| | | | | 901/1 |
| 8,041,458 B2 * | 10/2011 | Amino | .................... | G01S 17/88 |
| | | | | 700/259 |
| 8,918,209 B2 * | 12/2014 | Rosenstein | .......... | G05D 1/0246 |
| | | | | 700/250 |
| 9,014,848 B2 * | 4/2015 | Farlow | .................. | B25J 19/023 |
| | | | | 701/25 |
| 9,643,319 B2 * | 5/2017 | Ono | ....................... | B25J 9/1697 |
| 9,871,957 B2 * | 1/2018 | Ono | ....................... | H04N 23/57 |

(Continued)

FOREIGN PATENT DOCUMENTS

WO    WO-2021079575 A1 *  4/2021  ............. G01S 17/08

*Primary Examiner* — Timothy Wilhelm

(57) ABSTRACT

A robot in accordance with at least some embodiments of the present technology includes a neck region through which the robot is configured to transmit and receive light. The robot defines a robot height and includes a body, a head carried by the body, and a neck extending between the head and the body along the robot height. The robot further includes a structural neck frame at a periphery of the neck in a plane perpendicular to the robot height. The structural neck frame defines windows distributed around the periphery of the neck. The robot further includes a sensor disposed at least partially within the structural neck frame. The sensor includes a laser configured to transmit light via the windows and a detector configured to receive light via the windows. A field of view of the sensor extends at least 320 degrees around the neck.

19 Claims, 25 Drawing Sheets

(56)          References Cited

U.S. PATENT DOCUMENTS

| | | | | |
|---|---|---|---|---|
| 10,946,528 | B2 * | 3/2021 | Gupta | B25J 11/0005 |
| 11,097,431 | B2 * | 8/2021 | Keeney-Ritchie | B25J 9/0006 |
| 11,180,205 | B2 * | 11/2021 | Amino | B25J 5/007 |
| 11,279,041 | B2 * | 3/2022 | Mahoor | B25J 11/0015 |
| 11,440,198 | B2 * | 9/2022 | Ding | B25J 9/126 |
| 11,686,884 | B2 * | 6/2023 | Shinohara | G02B 3/0062 |
| | | | | 359/614 |
| 11,707,852 | B1 * | 7/2023 | Hurst | B25J 13/081 |
| | | | | 74/490.01 |
| 12,290,940 | B1 * | 5/2025 | Abate | B62D 57/032 |
| 12,365,094 | B2 * | 7/2025 | McCall | B25J 11/0005 |
| 12,403,611 | B2 * | 9/2025 | McCall | B25J 11/0015 |
| 2012/0197439 | A1 * | 8/2012 | Wang | B25J 11/009 |
| | | | | 901/1 |
| 2019/0105783 | A1 * | 4/2019 | Al Moubayed | B25J 11/0015 |

* cited by examiner

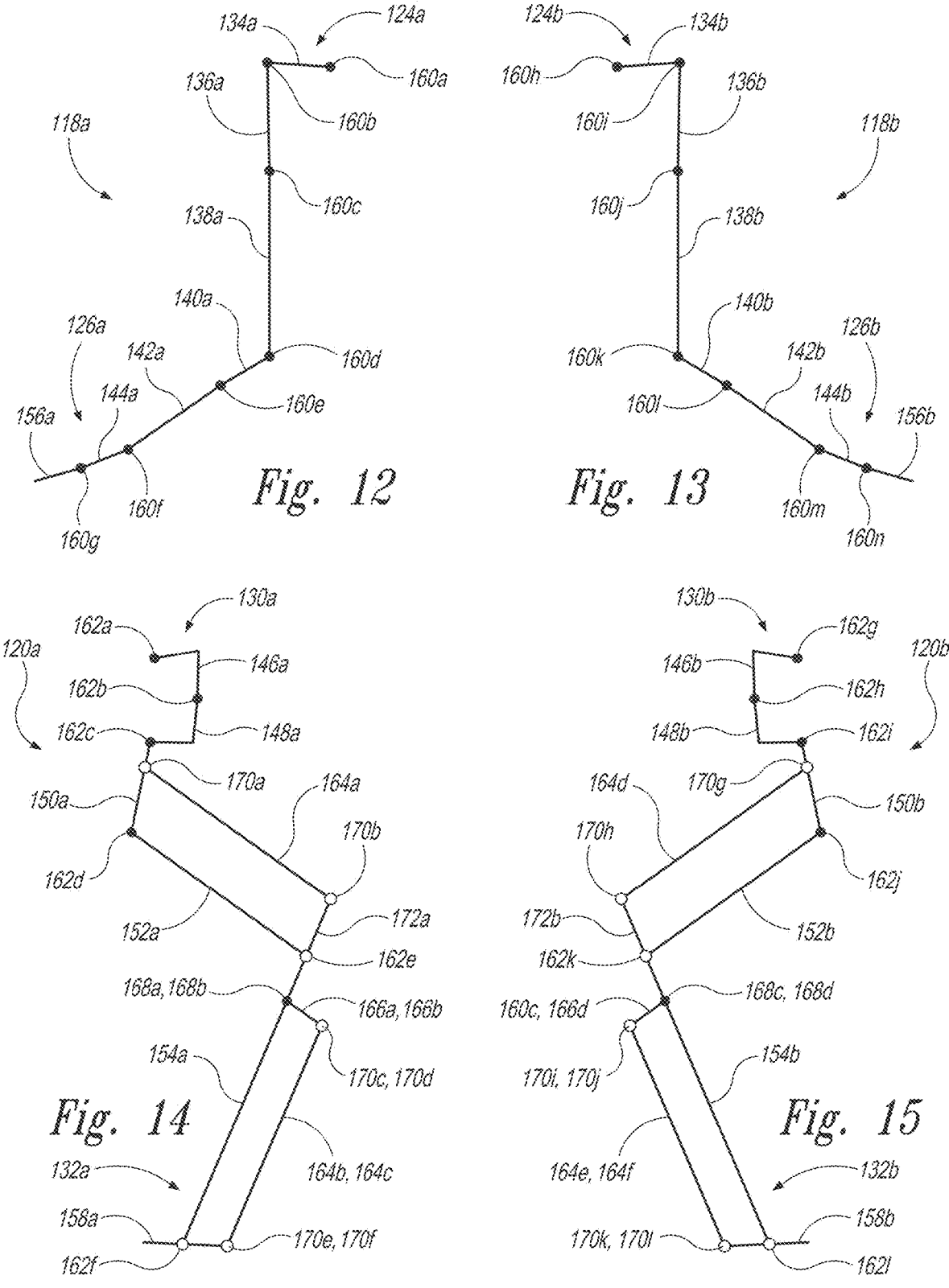

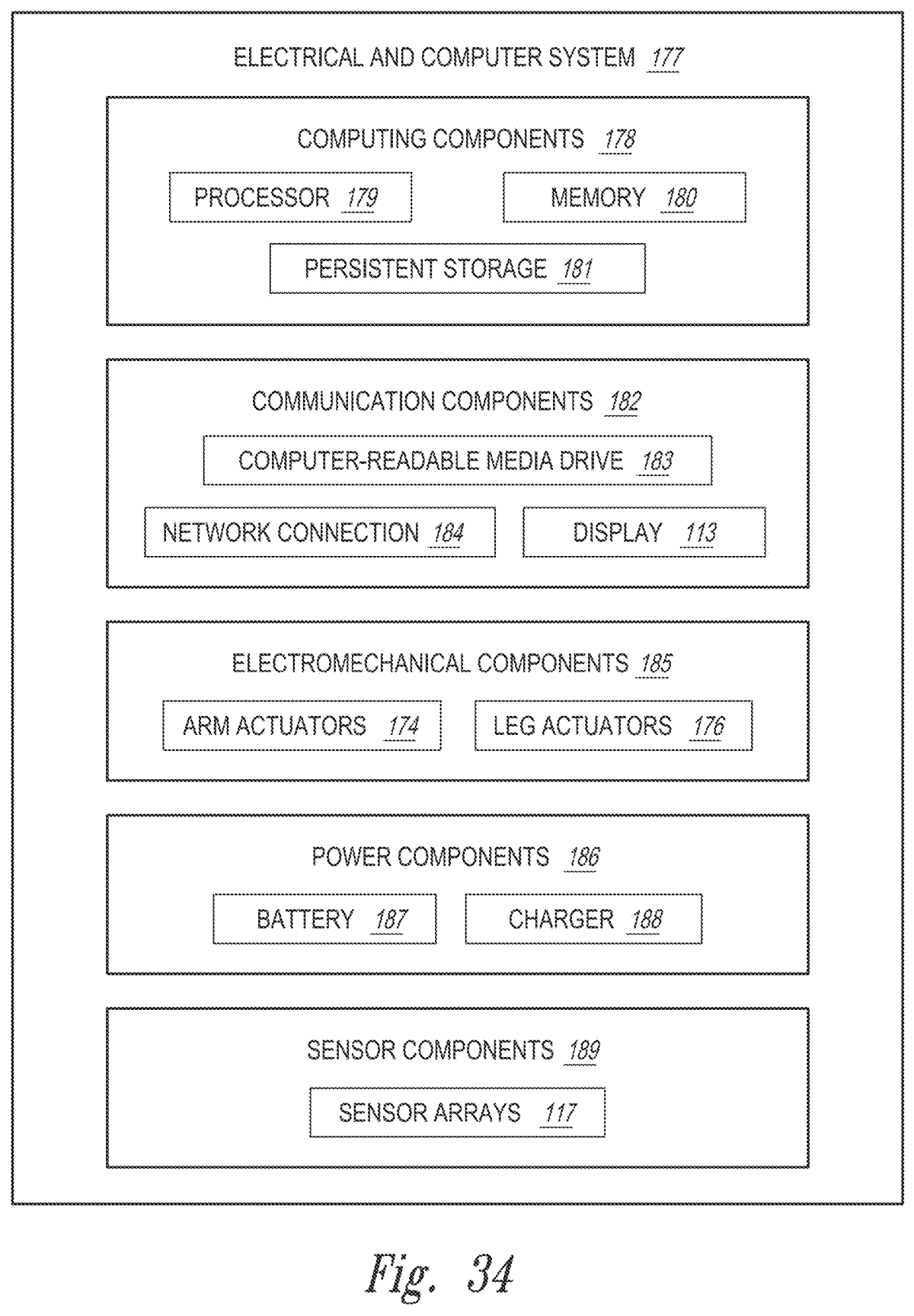

ELECTRICAL AND COMPUTER SYSTEM _177_

COMPUTING COMPONENTS _178_

PROCESSOR _179_

MEMORY _180_

PERSISTENT STORAGE _181_

COMMUNICATION COMPONENTS _182_

COMPUTER-READABLE MEDIA DRIVE _183_

NETWORK CONNECTION _184_

DISPLAY _113_

ELECTROMECHANICAL COMPONENTS _185_

ARM ACTUATORS _174_

LEG ACTUATORS _176_

POWER COMPONENTS _186_

BATTERY _187_

CHARGER _188_

SENSOR COMPONENTS _189_

SENSOR ARRAYS _117_

*Fig. 34*

LIDAR SENSORS OF LEGGED ROBOTS AND RELATED TECHNOLOGY

CROSS-REFERENCE TO RELATED APPLICATION

This claims the benefit of U.S. Provisional Application No. 63/482,008, filed Jan. 27, 2023, filed Jan. 27, 2023. The foregoing application is incorporated herein by reference in its entirety. To the extent the foregoing application or any other material incorporated herein by reference conflicts with the present disclosure, the present disclosure controls.

TECHNICAL FIELD

The present technology relates to sensors of legged robots.

BACKGROUND

Many simple tasks that humans currently perform are amenable to automation using robotics. Among such tasks are those involving moving goods between locations within distribution centers. For example, after a trailer containing goods arrives at a distribution center, human workers are needed to move the goods from the trailer onto a conveyor that carries the goods to other locations within the distribution center for further processing. Similarly, although conveyors can be used to deliver outgoing goods to loading docks and palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 12-15 are partially schematic diagrams showing kinematic chains corresponding, respectively, to the first arm, the second arm, the first leg, and the second leg of the robot shown in FIG. 1.

FIG. 34 is a block diagram illustrating an electrical and computer system of the robot shown in FIG. 1.

DETAILED DESCRIPTION

Figure 1:
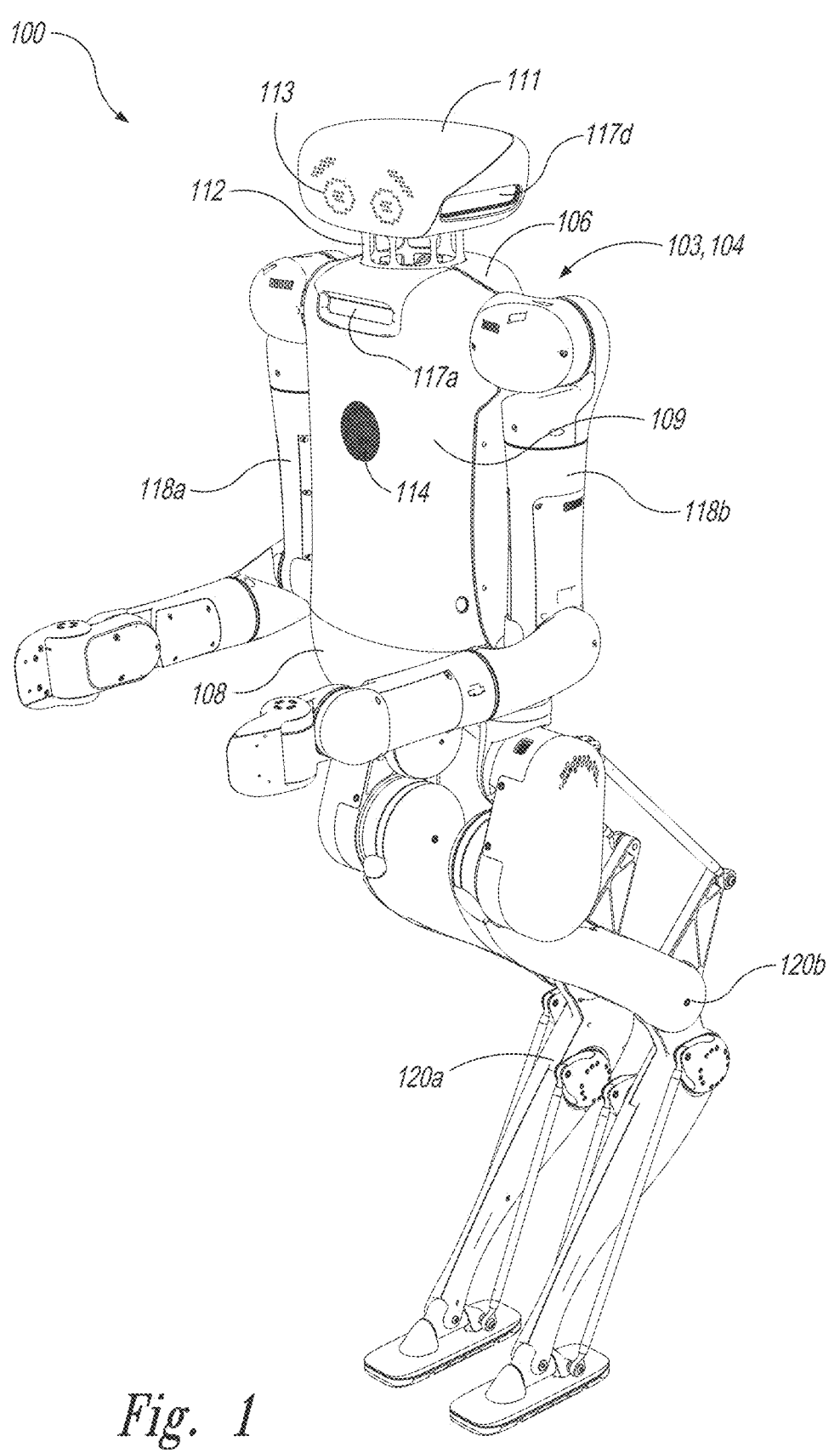
FIGS. 1-3 are, respectively, a first perspective view, a second perspective view, and a front profile view of a robot in accordance with at least some embodiments of the present technology with the robot being in a first state.

Disclosed herein are robots and associated devices, systems, and methods. Robots in accordance with at least some embodiments of the present technology include innovative features related to lidar (light detection and ranging) sensors and/or other types of light sensors in the context of robotics. Lidar sensors typically incorporate a laser, a detector, and a processor that work together to generate data corresponding to the positions of objects in an environment. The laser generates ultraviolet, visible, or near-infrared light pulses. The system scans these light pulses over an environment via a rotating mirror. The detector receives reflections of the light pulses in the form of backscatter. For a given light pulse, the processor uses the speed of light and a time of flight between transmitting and receiving the light pulse to determine a distance between the sensor and an object in a direction in which the light pulse was transmitted. The processor then aggregates many such measurements to form a point cloud. Other systems (e.g., navigation systems, object-recognition systems, etc.) can reference this point cloud to inform various robot operations. For example, a robot may detect that an obstacle is nearby based on a cluster of close-proximity point measurements. The robot may then change its course or otherwise respond to the detected obstacle. A lidar-generated point cloud can additionally or alternatively provide information about composition, size, behavior (e.g., motion), shape, and/or one or more other aspects of an object in an environment. Moreover, lidar is merely one example of a type of light sensor useful in the context of robotics. Other types of light sensors (e.g., stereo cameras) may be useful for the same and/or other purposes.

The inventors have recognized challenges and opportunities associated with incorporating light sensors into legged robots as well as deficiencies in conventional approaches to this aspect of robot design. Light sensors typically benefit from an expansive field of view. Conventionally, this has led to the placement of light sensors on masts projecting vertically at uppermost portions of robots. Such placement, however, may have undesirable consequences for legged robots. Legged robots are typically more agile and versatile than non-legged robots. Use of mast-mounted light sensors with legged robots may unduly interfere with this agility and/or versatility. For example, a mast-mounted light sensor may increase the likelihood of collisions with objects in working environments designed primarily for humans and/ or otherwise adversely affect a legged robot's compatibility with such environments. Furthermore, light sensors, particularly lidar sensors, tend to be relatively expensive and fragile. Legged robots may be more prone to falling than other types of robots. Incorporating a light sensor into a legged robot at a highly exposed location, such as at a vertical mast, is therefore problematic for robustness. Incorporating a mast-mounted or other highly exposed light sensor into a bipedal robot may also cause the robot to have a less human-like form, thereby adversely affecting how humans perceive and interact with the robot. As yet another consideration, relative to non-legged robots (e.g., wheeled robots), legged robots typically sway, bounce, and/or otherwise shift far more during routine motion. This can cause certain types of occlusion of the field of view of a light sensor to be less detrimental to operation of the light sensor than would otherwise be the case. For example, a lidar sensor may be capable of compensating for small occlusions that move into and out of the sensor's field of view rapidly, such as in connection with shifting during routine motion of a legged robot. This consideration can allow for sensor placements and other features in a legged robot that would be less advantageous in a non-legged robot.

The specific features of working environments designed primarily for humans may be unknown, but can at least be assumed to accommodate the form, motion, and sensory characteristics of a typical human worker. Accordingly, providing a legged robot with at least some of the characteristics of a typical human worker can increase the versatility of the robot. Human light sensors (i.e., eyes) are anteriorly directed and carried at the head. A legged robot including light sensors that mimic human eyes may be compatible in this regard to human-centric environments. A lack of posteriorly directed light sensing, however, is a significant human limitation. A legged robot including light sensors that merely mimic human eyes, therefore, would miss an opportunity to at least partially overcome this limitation. Rather than including a mast-mounted or solely anteriorly directed light sensor, a robot in accordance with at least some embodiments of the present technology includes a light sensor that receives and/or transmits light at least partially via a neck of the robot. This can be useful to enhance a field of view of the light sensor, to enhance compatibility of the robot with human-centric environments, to enhance compactness of the robot, to reduce extraneous reflections, and/or to protect the light sensor from impact damage, among other potential advantages.

The foregoing and other features of robots and associated devices, systems, and methods in accordance with various embodiments of the present technology are further described below with reference to FIGS. 1-49. Although devices, systems, and methods may be described herein primarily or entirely in the context of warehouse robots, other contexts are within the scope of the present technology. For example, suitable features of described devices, systems, and methods can be implemented in the context of robots that operate in non-warehouse environments, such as in the context of terrain-mapping robots, in the context of social robots, etc. Furthermore, it should be understood, in general, that other devices, systems, and methods in addition to those disclosed herein are within the scope of the present technology. For example, devices, systems, and methods in accordance with embodiments of the present technology can have different and/or additional configurations, components, procedures, etc. than those disclosed herein. Moreover, devices, systems, and methods in accordance with embodiments of the present technology can be without one or more of the configurations, components, procedures, etc. disclosed herein without deviating from the present technology.

Examples of Robot Systems

Figure 2:
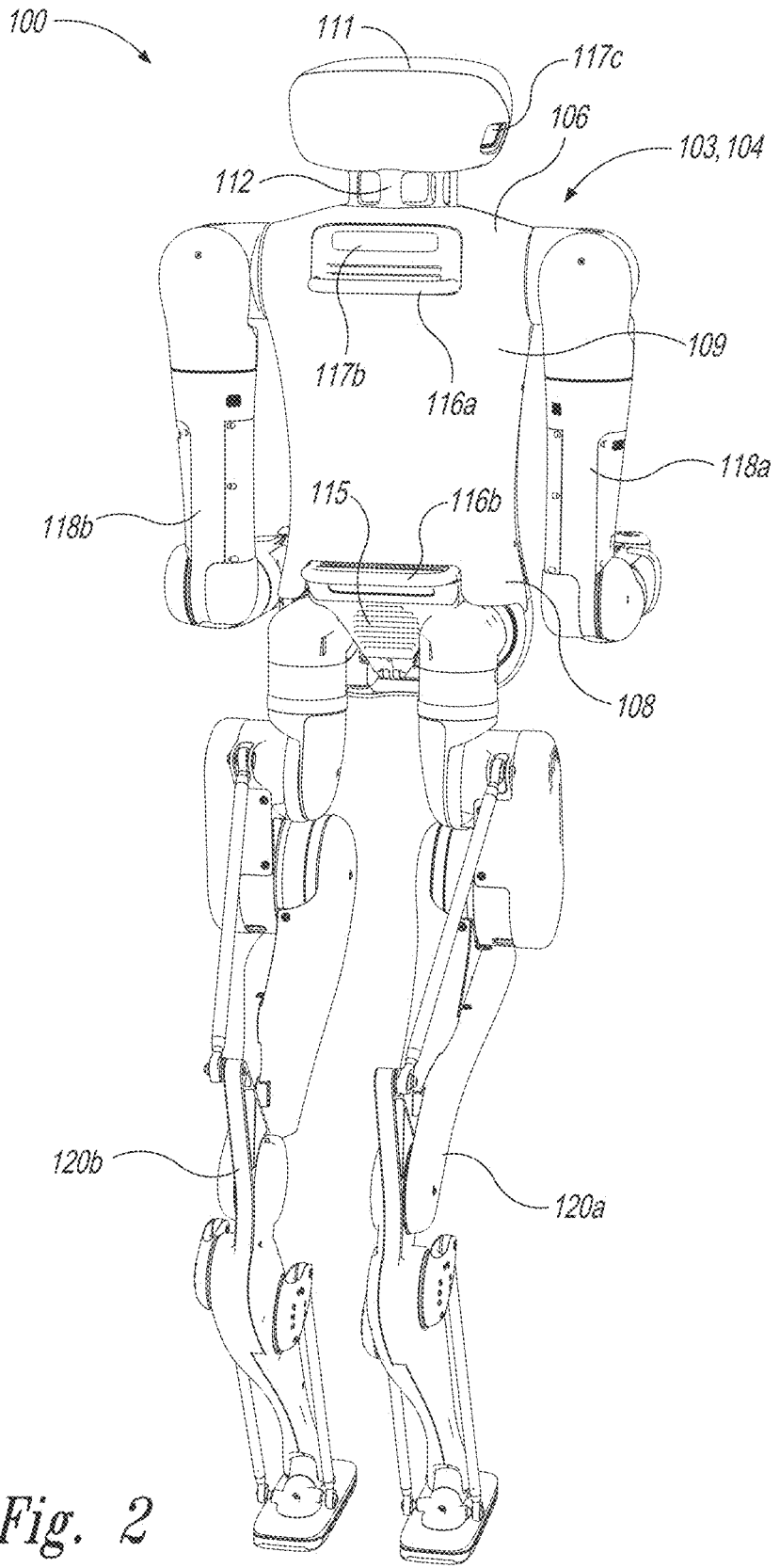
Figure 3:
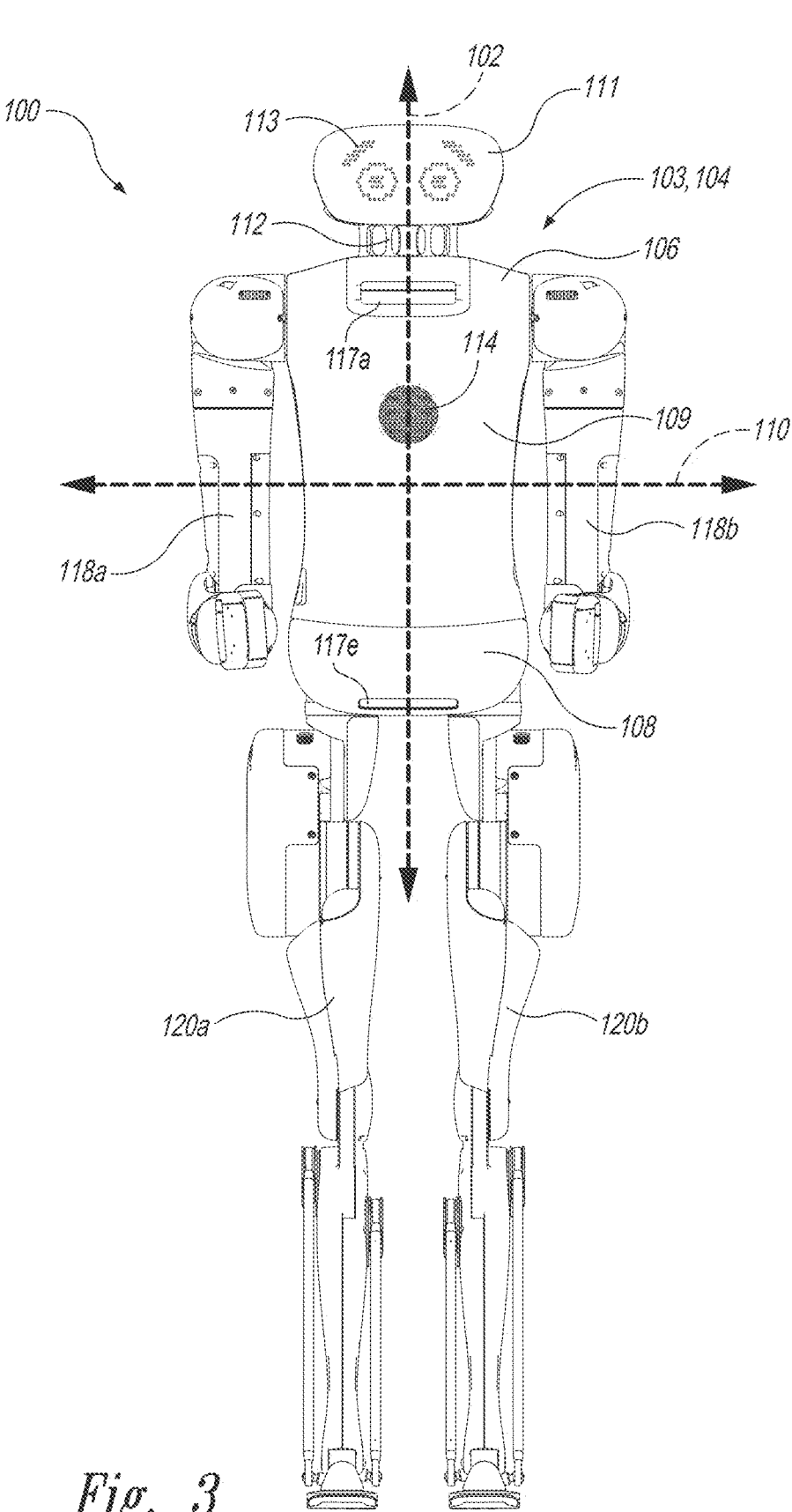
Figures 4, 5, 6, 7:
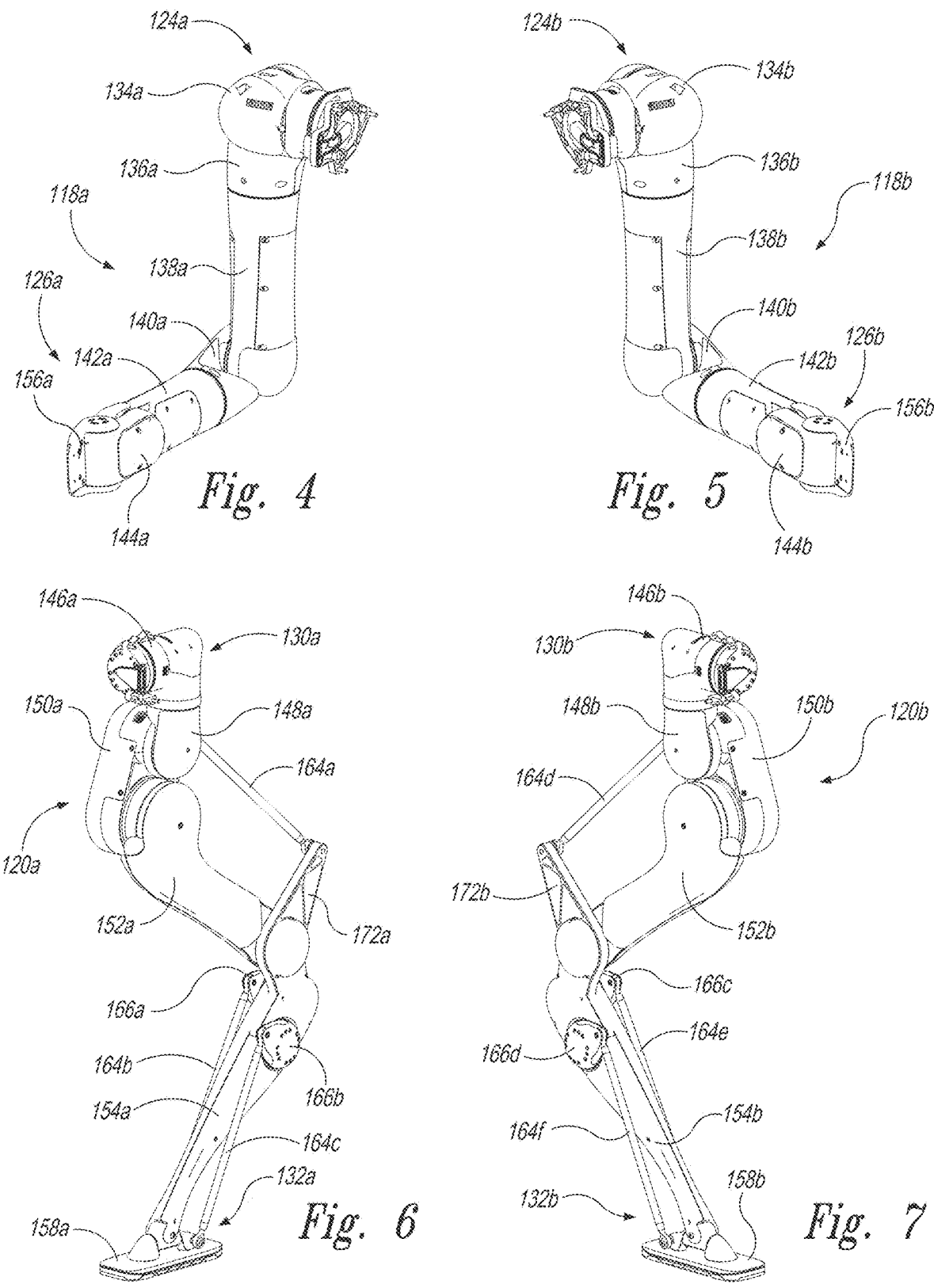
FIGS. 4-7 are perspective views of a first arm, a second arm, a first leg, and a second leg, respectively, of the robot shown in FIG. 1.
Figures 8, 9, 10, 11:
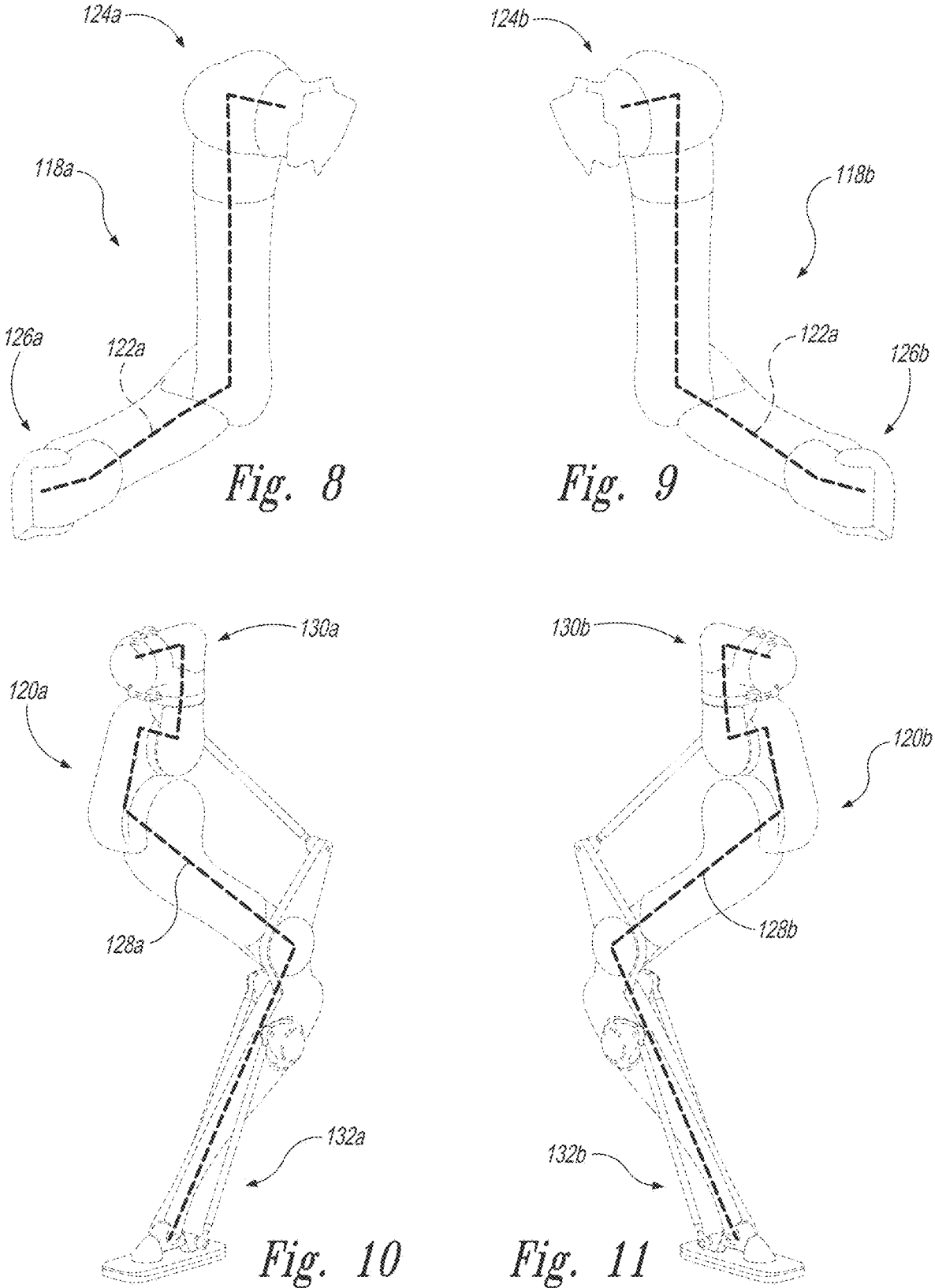
FIGS. 8-11 are silhouette views of the first arm, the second arm, the first leg, and the second leg, respectively, of the robot shown in FIG. 1 illustrating corresponding arm and leg lengths.

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117e) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions. The sensor array 117e can be at the inferior portion 108 of the torso 104 and directed anteriorly and inferiorly toward a ground level in front of the robot 100.

The robot 100 can further include articulated appendages carried by the torso 104. Among these articulated appendages, the robot 100 can include arms 118a, 118b and legs 120a, 120b. In at least some cases, the robot 100 is configured to manipulate objects via the arms 118a, 118b, such as bimanually. In these and other cases, the robot 100 can be configured to ambulate via the legs 120a, 120b, such as bipedally. FIGS. 4-15 show selected features of the arms 118a, 118b and legs 120a, 120b in greater detail. In particular, FIGS. 4-7 are perspective views of the arms 118a, 118b and legs 120a, 120b, respectively. FIGS. 8-11 are silhouette views of the arms 118a, 118b and legs 120a, 120b, respectively. Finally, FIGS. 12-15 are partially schematic diagrams showing kinematic chains corresponding to the arms 118a, 118b and legs 120a, 120b, respectively. In FIGS. 12-15, lines represent links, filled circles represent active joints, and open circles represent inactive joints.

With reference to FIGS. 1-15 together, the arms 118a, 118b can define respective arm lengths 122a, 122b extending from the torso 104. For clarity of illustration, the arm lengths 122a, 122b are only indicated in FIGS. 8 and 9, respectively. The arms 118a, 118b can have respective proximal end portions 124a, 124b and respective distal end portions 126a, 126b at opposite ends of the respective arm lengths 122a, 122b. The arms 118a, 118b can be connected to the torso 104 via the respective proximal end portions 124a, 124b thereof and the superior portion 106 of the torso 104. Similar to the arms 118a, 118b, the legs 120a, 120b can define respective leg lengths 128a, 128b extending from the torso 104. For clarity of illustration, the leg lengths 128a, 128b are only indicated in FIGS. 10 and 11, respectively. The legs 120a, 120b can have respective proximal end portions 130a, 130b and respective distal end portions 132a, 132b at opposite ends of the respective leg lengths 128a, 128b. The legs 120a, 120b can be connected to the torso 104 via the respective proximal end portions 130a, 130b thereof and the inferior portion 108 of the torso 104.

The arms 118a, 118b and the legs 120a, 120b can define kinematic chains. In at least some cases, the kinematic chains corresponding to the arms 118a, 118b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. The robot 100 can include links at progressively more distal (i.e., lower) levels within the kinematic chains corresponding to the arms 118a, 118b and the legs 120a, 120b and at progressively more distal (i.e., farther) positions along the arm lengths 122a, 122$b$ and the leg lengths 128$a$, 128$b$. As parts of the arms 118$a$, 118$b$, the robot 100 can include proximal shoulder links 134$a$, 134$b$, distal shoulder links 136$a$, 136$b$, upper arm links 138$a$, 138$b$, elbow links 140$a$, 140$b$, lower arm links 142$a$, 142$b$, and wrist links 144$a$, 144$b$. Similarly, as parts of the legs 120$a$, 120$b$, the robot 100 can include proximal hip links 146$a$, 146$b$, distal hip links 148$a$, 148$b$, proximal thigh links 150$a$, 150$b$, distal thigh links 152$a$, 152$b$, and calf links 154$a$, 154$b$.

As further parts of the arms 118$a$, 118$b$, the robot 100 can include end effectors 156$a$, 156$b$ opposite to the proximal end portions 124$a$, 124$b$ along the arm lengths 122$a$, 122$b$ and distal to the wrist links 144$a$, 144$b$. As further parts of the legs 120$a$, 120$b$, the robot 100 can include feet 158$a$, 158$b$ opposite to the proximal end portions 130$a$, 130$b$ along the leg lengths 128$a$, 128$b$ and distal to the calf links 154$a$, 154$b$. The end effectors 156$a$, 156$b$ can be at distalmost positions along the arm lengths 122$a$, 122$b$. Similarly, the feet 158$a$, 158$b$ can be at distalmost positions along the leg lengths 128$a$, 128$b$. In the illustrated embodiment, the end effectors 156$a$, 156$b$ and the feet 158$a$, 158$b$ are not articulated. In other embodiments, counterparts of some or all of the end effectors 156$a$, 156$b$ and the feet 158$a$, 158$b$ can be articulated, such as with one or more movable fingers or toes.

With reference again to FIGS. 1-15, the robot 100 can include arm joints 160 (individually identified as arm joints 160$a$-160$n$) as parts of the arms 118$a$, 118$b$. The arm joints 160$a$-160$n$ can be disposed between neighboring links within the kinematic chains corresponding to the arms 118$a$, 118$b$ and at opposite ends of these kinematic chains. For clarity of illustration, the arm joints 160 are only indicated in FIGS. 12 and 13. The robot 100 can further include leg joints 162 (individually identified as leg joints 162$a$-162$l$) as parts of the legs 120$a$, 120$b$. Similar to the arm joints 160$a$-160$n$, the leg joints 162$a$-162$l$ can be disposed between neighboring links within the kinematic chains corresponding to the legs 120$a$, 120$b$ and at opposite ends of these kinematic chains. For clarity of illustration, the leg joints 162 are only indicated in FIGS. 14 and 15. The arm joints 160$a$-160$n$ and the leg joints 162$a$-162$l$ may be referenced herein in connection with the distally neighboring link along the kinematic chain of the corresponding one of the arms 118$a$, 118$b$ and the legs 120$a$, 120$b$. For example, the arm joints 160$f$, 160$m$ may be referenced herein as the wrist joints 160$f$, 160$m$.

In FIGS. 1-3, the robot 100 is shown in a first state, which can correspond to a home pose, a neutral pose, etc. well-suited to an object-manipulation task. In the first state, the proximal shoulder links 134$a$, 134$b$ can extend laterally from the torso 104. Also, in the first state, the distal shoulder links 136$a$, 136$b$ and the upper arm links 138$a$, 138$b$ can extend inferiorly from the proximal shoulder links 134$a$, 134$b$. Also, in the first state, the elbow links 140$a$, 140$b$, the lower arm links 142$a$, 142$b$, and the wrist links 144$a$, 144$b$ can extend anteriorly from the upper arm links 138$a$, 138$b$. Also, in the first state, the proximal hip links 146$a$, 146$b$ can extend posteriorly from the torso 104. Also, in the first state, the distal hip links 148$a$, 148$b$ and the proximal thigh links 150$a$, 150$b$ can extend inferiorly from the proximal hip links 146$a$, 146$b$. Also, in the first state, the distal thigh links 152$a$, 152$b$ can extend inferiorly and posteriorly from the proximal thigh links 150$a$, 150$b$. Finally, in the first state, the calf links 154$a$, 154$b$ can extend inferiorly and anteriorly from the distal thigh links 152$a$, 152$b$.

In at least some cases, the calf joints 162$e$, 162$k$ and the foot joints 162$f$, 162$l$ are passive. As additional parts of the legs 120$a$, 120$b$, the robot 100 can include connection shafts 164 (individually identified as connection shafts 164$a$-164$f$), cranks 166 (individually identified as cranks 166$a$-166$d$), ancillary active joints 168 (individually identified as ancillary active joints 168$a$-168$d$), and ancillary passive joints 170 (individually identified as ancillary passive joints 170$a$-170$l$). The connection shafts 164$a$, 164$d$ can extend between the proximal thigh links 150$a$, 150$b$ and the calf links 154$a$, 154$b$. When the robot 100 is in the first state, the connection shafts 164$a$, 164$d$ can be posteriorly spaced apart from the distal thigh links 152$a$, 152$b$ and within 10 degrees of parallel to (e.g., within 5 degrees of parallel to and/or substantially parallel to) corresponding portions of the leg lengths 128$a$, 128$b$. Moving the distal thigh joints 162$d$, 162$j$ from their positions when the robot 100 is in the first state can cause the connection shafts 164$a$, 164$d$ to move increasingly off parallel from the corresponding portions of the leg lengths 128$a$, 128$b$.

The calf links 154$a$, 154$b$ can include projections 172$a$, 172$b$ extending posteriorly and superiorly from the calf joints 162$e$, 162$k$. The ancillary passive joints 170$a$, 170$b$ can be at opposite ends of the connection shaft 164$a$. Similarly, the ancillary passive joints 170$g$, 170$h$ can be at opposite ends of the connection shaft 164$d$. Due to their kinematic arrangement, an actuated position of the distal thigh joint 162$d$ can dictate positions of the calf joint 162$e$ and of the ancillary passive joints 170$a$, 170$b$. Similarly, due to their kinematic arrangement, an actuated position of the distal thigh joint 162$j$ can dictate positions of the calf joint 162$k$ and of the ancillary passive joints 170$g$, 170$h$. The calf links 154$a$, 155$b$ can carry the cranks 166$a$, 166$c$ laterally. The calf links 154$a$, 155$b$ can further carry the cranks 166$b$, 166$d$ medially. The ancillary active joints 168$a$, 168$b$ can be between the cranks 166$a$, 166$b$ and the calf link 154$a$. Similarly, the ancillary active joints 168$c$, 168$d$ can be between the cranks 166$c$, 166$d$ and the calf link 154$b$.

The connection shafts 164$b$, 164$c$ can extend between the cranks 166$a$, 166$b$ and the foot 158$a$ and can be spaced apart laterally and medially, respectively, from the calf link 154$a$. Similarly, the connection shafts 164$e$, 164$f$ can extend between the cranks 166$c$, 166$d$ and the foot 158$b$ and can be spaced apart laterally and medially, respectively, from the calf link 154$b$. The ancillary passive joints 170$c$, 170$e$ can be at opposite ends of the connection shaft 164$b$. The ancillary passive joints 170$d$, 170$f$ can be at opposite ends of the connection shaft 164$c$. The ancillary passive joints 170$i$, 170$k$ can be at opposite ends of the connection shaft 164$e$. Finally, the ancillary passive joints 170$j$, 170$l$ can be at opposite ends of the connection shaft 164$f$. The ancillary active joints 168$a$, 168$b$ can be configured to operate in concert to move the foot 158$a$ relative to the calf link 154$a$. Due to their kinematic arrangement, actuated positions of the ancillary active joints 168$a$, 168$b$ can dictate positions of the foot joint 162$f$ and of the ancillary passive joints 170$c$-170$f$. Similarly, the ancillary active joints 168$c$, 168$d$ can be configured to operate in concert to move the foot 158$b$ relative to the calf link 154$b$. Due to their kinematic arrangement, actuated positions of the ancillary active joints 168$c$, 168$d$ can dictate positions of the foot joint 162$l$ and of the ancillary passive joints 170$i$-170$l$.

The relative orientations of the arm joints 160$a$-160$l$, the relative positions of the arm joints 160$a$-160$l$, the dimensions of the links within the kinematic chains corresponding to the arms 118$a$, 118$b$, the shapes of these links, and/or other features of the arms 118$a$, 118$b$ can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162a-162l, the relative positions of the leg joints 162a-162l, the dimensions of the links within the kinematic chains corresponding to the legs 120a, 120b, the shapes of these links, and/or other features of the legs 120a, 120b can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

Figures 16, 17:
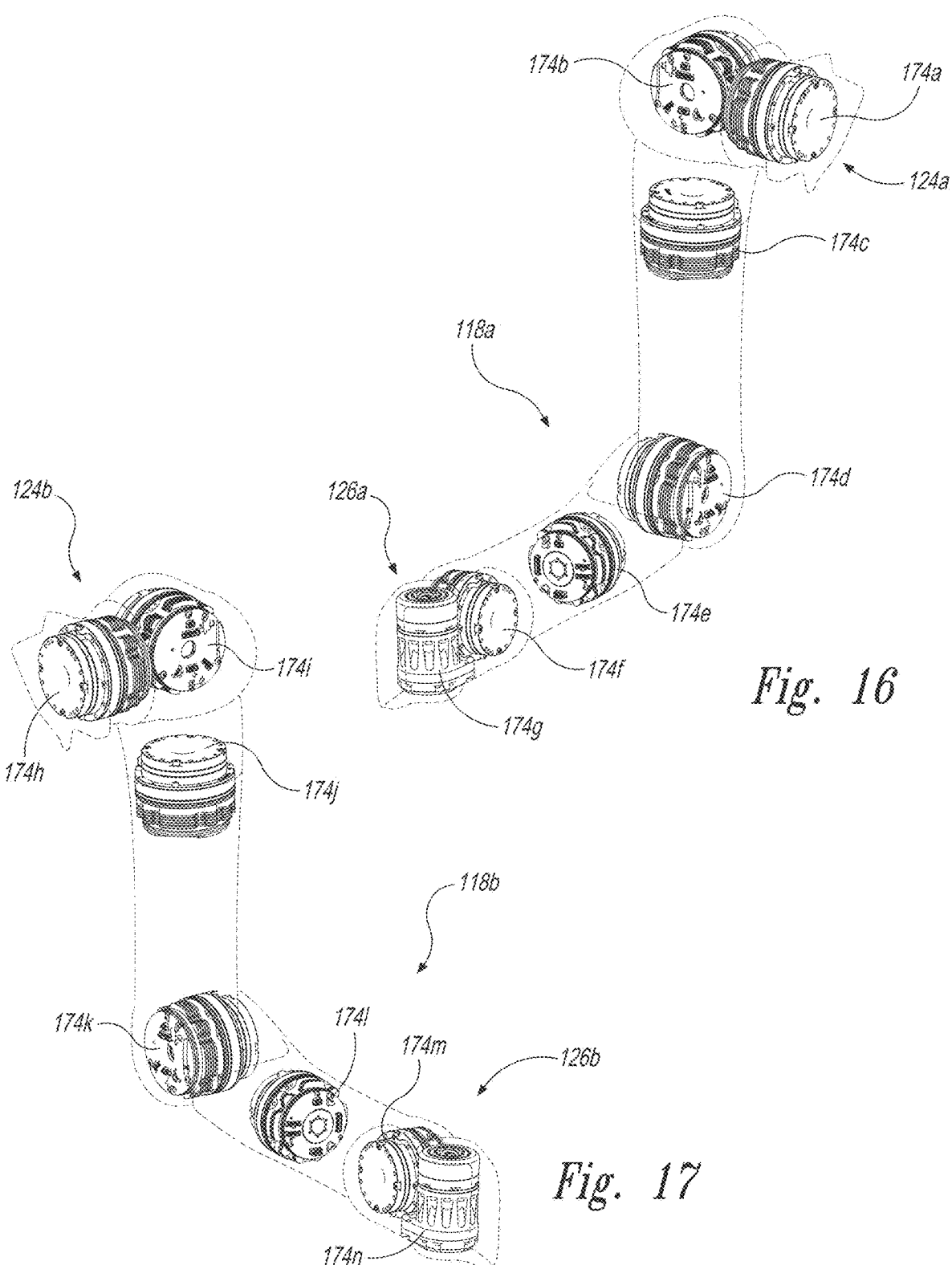
FIGS. 16-19 are partially transparent perspective views of the first arm, the second arm, the first leg, and the second leg, respectively, of the robot shown in FIG. 1 illustrating corresponding arm and leg actuators.

FIGS. 16 and 17 are partially transparent perspective views of the arms 118a, 118b, respectively. As shown in FIGS. 16 and 17, the robot 100 can include arm actuators 174 (individually identified as arm actuators 174a-174n) as parts of the arms 118a, 118b. The arm actuators 174a-174n can be embedded within, mounted to, or otherwise carried by the links within the kinematic chains corresponding to the arms 118a, 118b. In the illustrated embodiment, the arm actuators 174a-174n are incorporated into the arms 118a, 118b in the following manner. The arm actuators 174a, 174h are embedded within portions of the proximal shoulder links 134a, 134b at the proximal shoulder joints 160a, 160h. The arm actuators 174b, 174i are embedded within portions of the proximal shoulder links 134a, 134b at the distal shoulder joints 160b, 160i. The arm actuators 174c, 174j are embedded within portions of the upper arm links 138a, 138b at the upper arm joints 160c, 160j. The arm actuators 174d, 174k are embedded within portions of the upper arm links 138a, 138b at the elbow joints 160d, 160k. The arm actuators 174e, 174l are embedded within portions of the lower arm links 142a, 142b at the lower arm joints 160e, 160l. The arm actuators 174f, 174m are embedded within portions of the lower arm links 142a, 142b at the wrist joints 160f, 160m. Finally, the arm actuators 174g, 174n are embedded within portions of the wrist links 144a, 144b at the end effector joints 160g, 160n.

Figures 18, 19, 20:
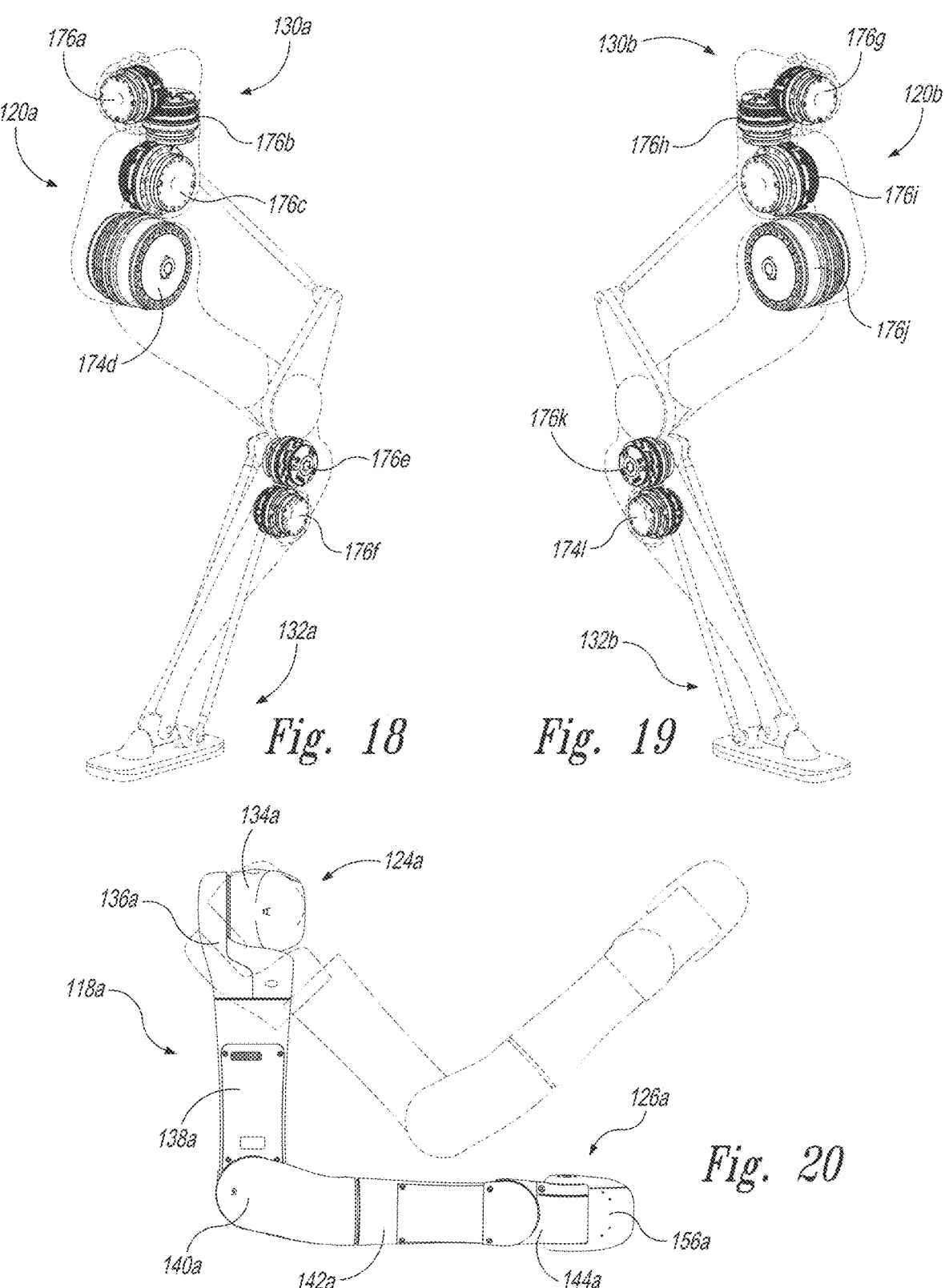
FIG. 20 is a side profile view of the first arm of the robot shown in FIG. 1 indicating isolated motion about an arm joint of the robot.
Figure 21:
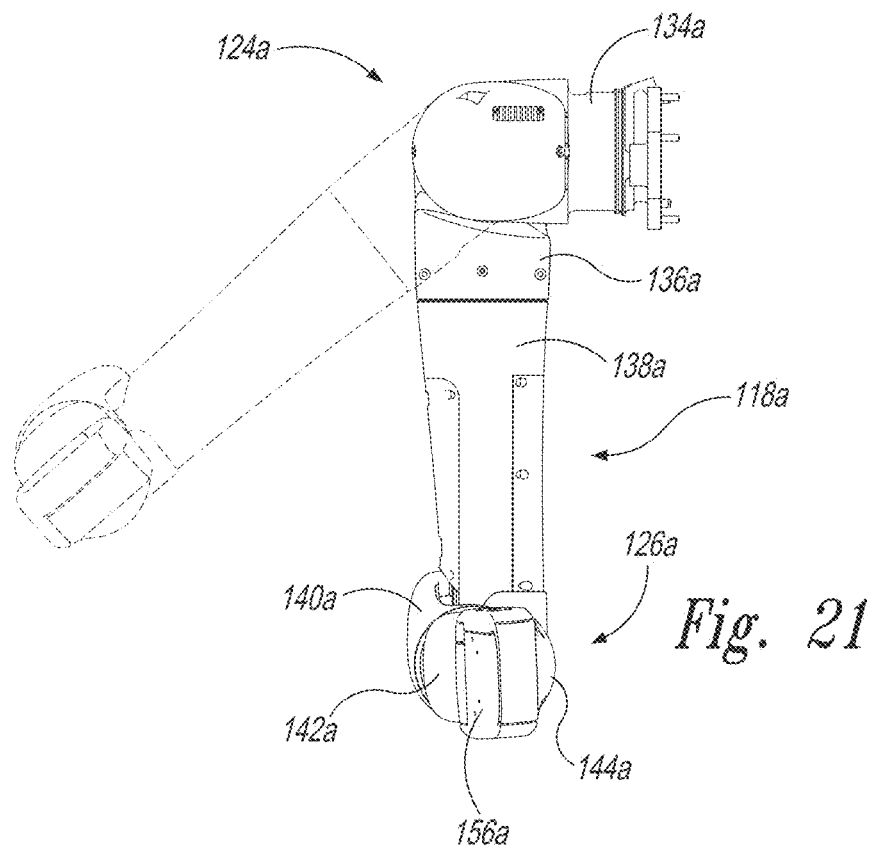
FIG. 21 is a front profile view of the first arm of the robot shown in FIG. 1 indicating isolated motion about an arm joint of the robot distal to the arm joint of FIG. 20 along the kinematic chain of FIG. 12.
Figure 22:
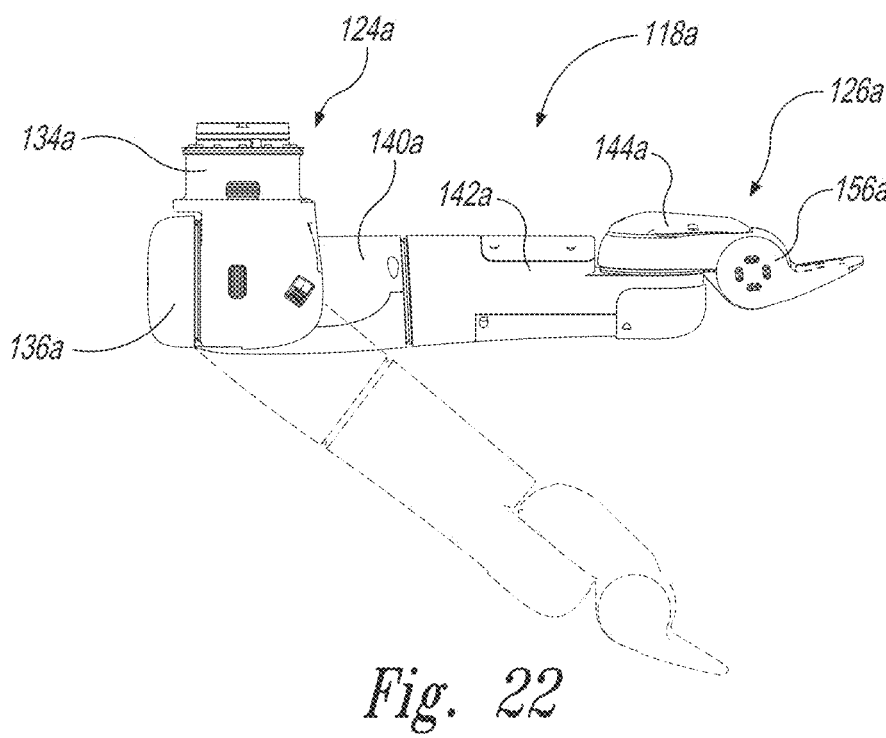
FIG. 22 is a top plan view of the first arm of the robot shown in FIG. 1 indicating isolated motion about an arm joint of the robot distal to the arm joint of FIG. 21 along the kinematic chain of FIG. 12.
Figures 23, 24, 25:
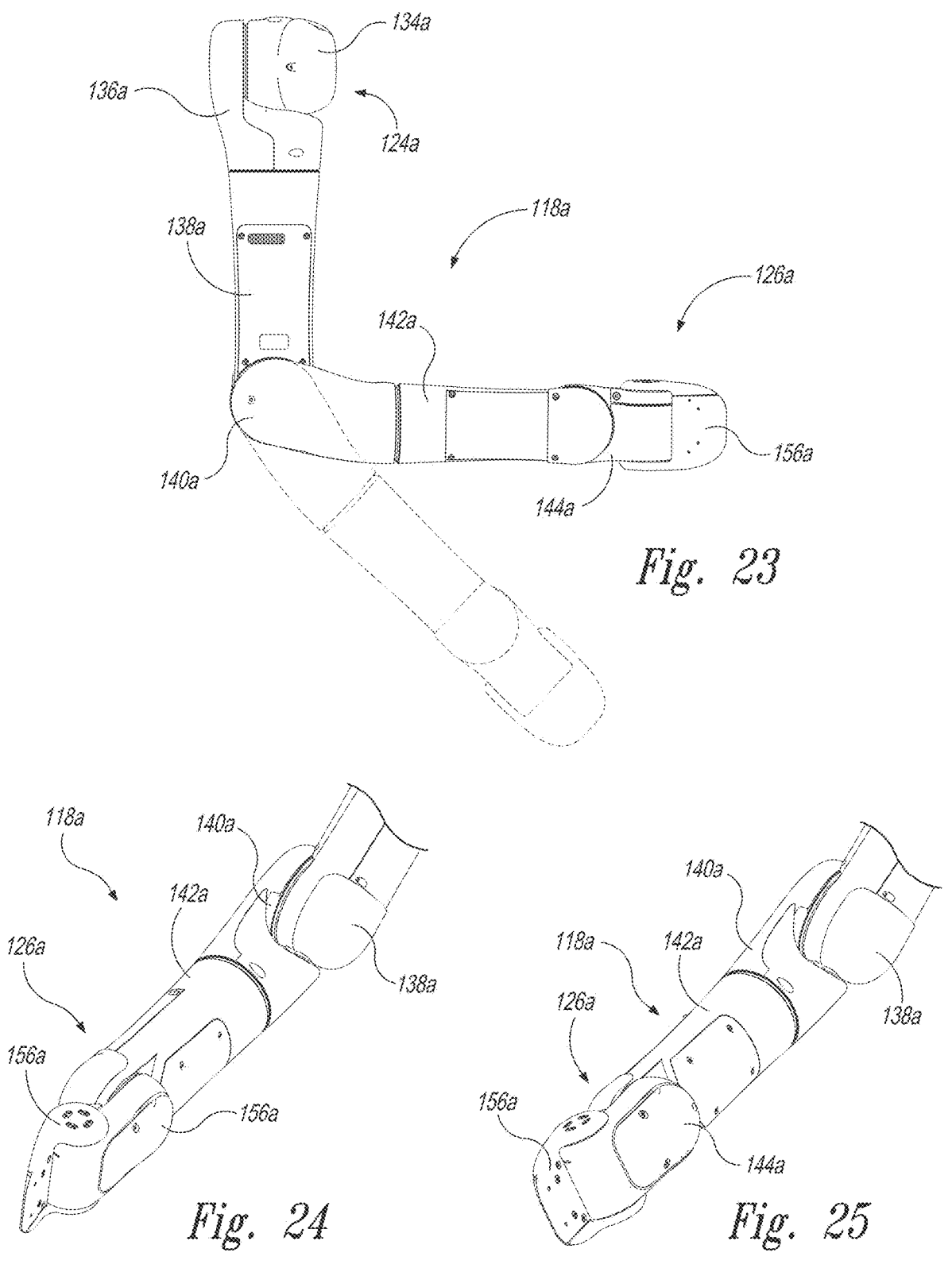
FIG. 23 is a side profile view of the first arm of the robot shown in FIG. 1 indicating isolated motion about an arm joint of the robot distal to the arm joint of FIG. 22 along the kinematic chain of FIG. 12.
FIGS. 24 and 25 are perspective views of a distal portion of the first arm of the robot shown in FIG. 1 indicating isolated motion about an arm joint of the robot distal to the arm joint of FIG. 23 along the kinematic chain of FIG. 12.

FIGS. 18 and 19 are partially transparent perspective views of the legs 120a, 120b, respectively. As shown in FIGS. 18 and 19, the robot 100 can include leg actuators 176 (individually identified as leg actuators 176a-176l) as parts of the legs 120a, 120b. The leg actuators 176a-176l can be embedded within, mounted to, or otherwise carried by the links within the kinematic chains corresponding to the legs 120a, 120b. In the illustrated embodiment, the leg actuators 176a-176l are incorporated into the legs 120a, 120b in the following manner. The leg actuators 176a, 176g are embedded within portions of the proximal hip links 146a, 146b at the proximal hip joints 162a, 162g. The leg actuators 176b, 176h are embedded within portions of the proximal hip links 146a, 146b at the distal hip joints 162b, 162h. The leg actuators 176c, 176i are embedded within portions of the proximal thigh links 150a, 150b at the proximal thigh joints 162c, 162i. The leg actuators 176d, 176j are embedded within portions of the proximal thigh links 150a, 150b at the distal thigh joints 162d, 162j. The leg actuators 176e, 176k are embedded within portions of the calf links 154a, 154b spaced apart from the foot joints 162f, 162l along the corresponding leg lengths 128a, 128b and are operably connected to the foot joints 162f, 162l via the cranks 166a, 166c and the connection shafts 164a, 164c. Finally, the leg actuators 176f, 176l are embedded within portions of the calf links 154a, 154b spaced apart from the foot joints 162f, 162l and distal to the leg actuators 176e, 176k along the corresponding leg lengths 128a, 128b and are operably connected to the foot joints 162f, 162l via the cranks 166b, 166d and the connection shafts 164b, 164d.

In at least some cases, the arm actuators 174a-174n and the leg actuators 176a-176l are rotary actuators including electric servo motors and corresponding harmonic gear units. This combination can be characterized by relatively high torque density, compact size, high efficiency, and low backlash, among other potentially advantageous features. Suitable actuators include those available from Harmonic Drive LLC (Beverly, Massachusetts). In other cases, counterparts of some or all of the arm actuators 174 and the leg actuators 176 can be pneumatic or hydraulic rather than electric, be linear rather than rotary, be stepper-type rather than servo-type, be direct drive rather than geared, and/or have different gearing than in the illustrated embodiment (e.g., cycloidal, spur, helical, miter, worm, rack, bevel, screw, etc.).

Figure 26:
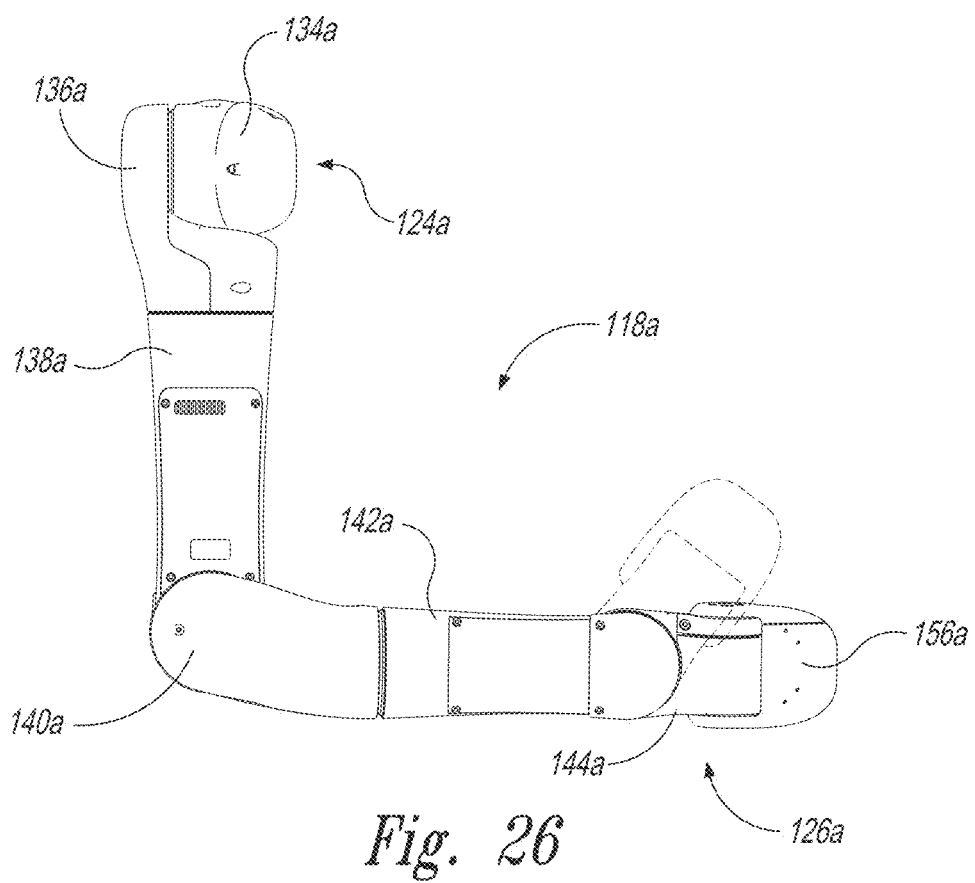
FIG. 26 is a side profile view of the first arm of the robot shown in FIG. 1 indicating isolated motion about an arm joint of the robot distal to the arm joint of FIGS. 24 and 25 along the kinematic chain of FIG. 12.
Figure 27:
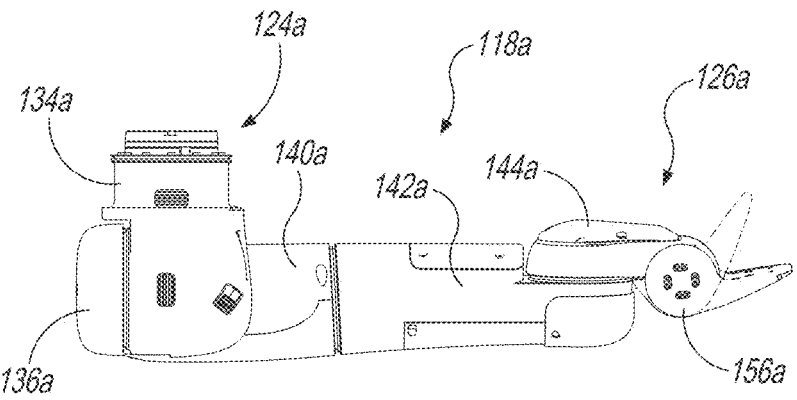
FIG. 27 is a top plan view of the first arm of the robot shown in FIG. 1 indicating isolated motion about an arm joint of the robot distal to the arm joint of FIG. 26 along the kinematic chain of FIG. 12.

FIGS. 20-23 are various views of the arm 118a indicating isolated motion about the proximal shoulder joint 160a, the distal shoulder joint 160b, the upper arm joint 160c, and the elbow joint 160d, respectively. FIGS. 24 and 25 are perspective views of a distal portion of the arm 118a indicating isolated motion about the lower arm joint 160e. FIGS. 26 and 27 are a side profile view and a top plan view, respectively, of the arm 118a indicating isolated motion about the wrist joint 160f and the end effector joint 160g, respectively. Motion about the arm joints 160h-160n of the arm 118b can correspond symmetrically about the midsagittal plane 102 (FIG. 3) to the motion about the arm joints 160a-160g of the arm 118a shown in FIGS. 20-27. In at least some cases, the proximal shoulder joints 160a, 160h, the upper arm joints 160c, 160j, and the lower arm joints 160e, 160l are configured to rotate about respective axes parallel to the corresponding arm lengths 122a, 122b. In these and other cases, the distal shoulder joints 160b, 160i, the elbow joints 160d, 160k, the wrist joints 160f, 160m, and the end effector joints 160g, 160n can be configured to rotate about respective axes off-parallel to (e.g., within 10 degrees of perpendicular to, within 5 degrees of perpendicular to and/or substantially perpendicular to) the corresponding arm lengths 122a, 122b.

Figures 28, 29:
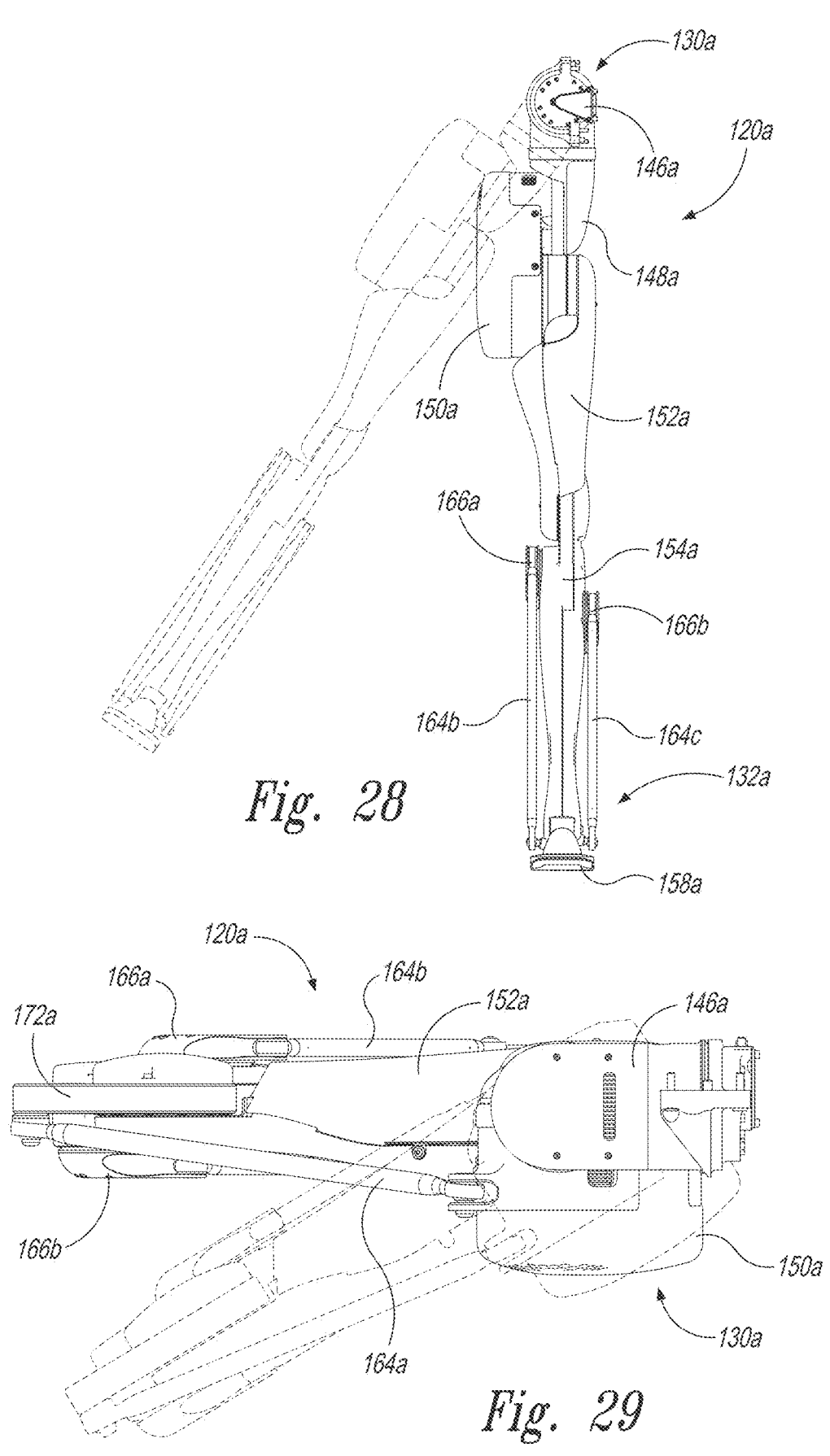
FIG. 28 is a front profile view of the first leg of the robot shown in FIG. 1 indicating isolated motion about a leg joint of the robot along the kinematic chain of FIG. 14.
FIG. 29 is a top plan view of the first leg of the robot shown in FIG. 1 indicating isolated motion about a leg joint of the robot distal to the leg joint of FIG. 28 along the kinematic chain of FIG. 14.
Figure 30:
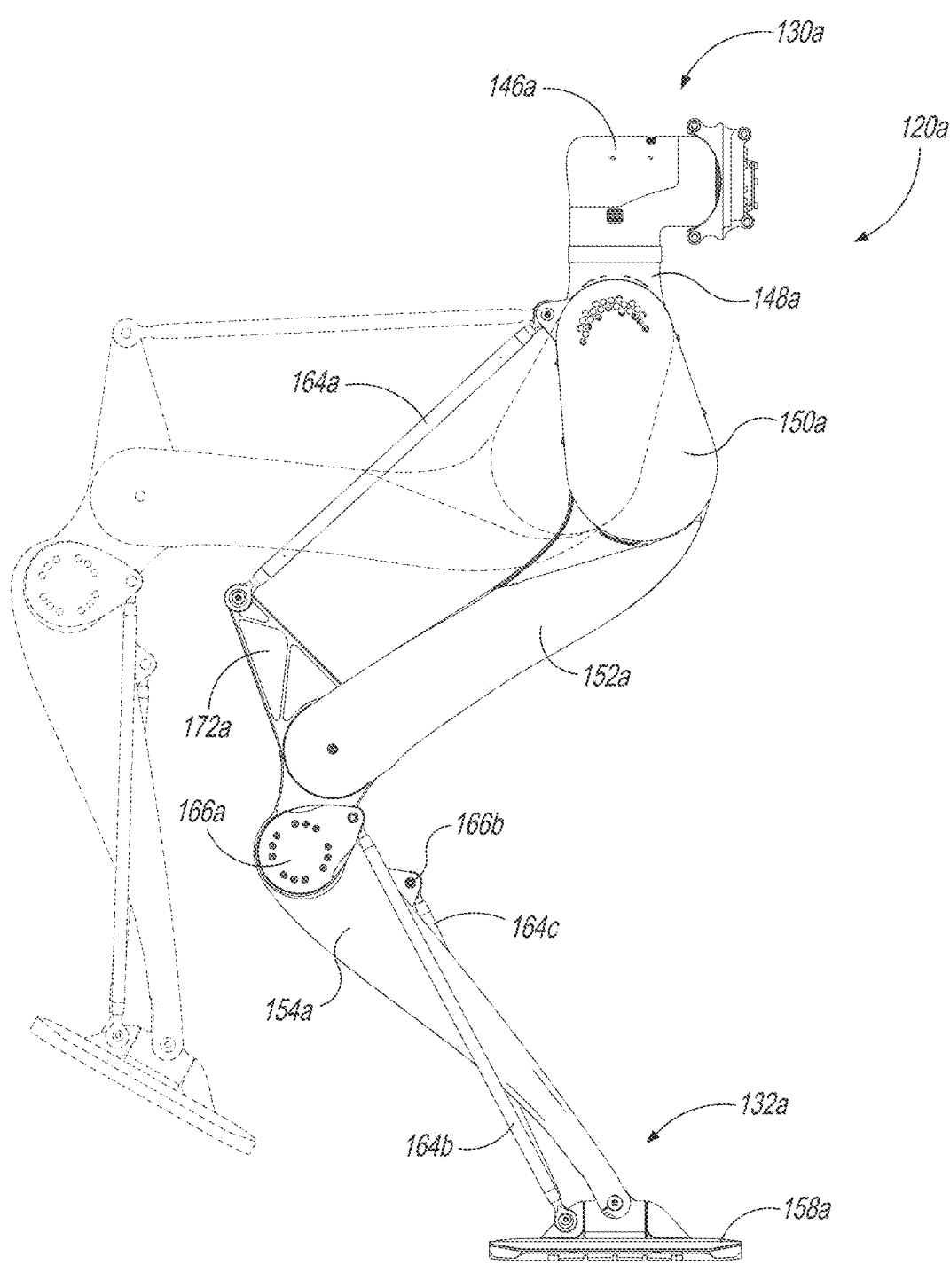
FIG. 30 is a side profile view of the first leg of the robot shown in FIG. 1 indicating isolated motion about a leg joint of the robot distal to the leg joint of FIG. 29 along the kinematic chain of FIG. 14.
Figure 31:
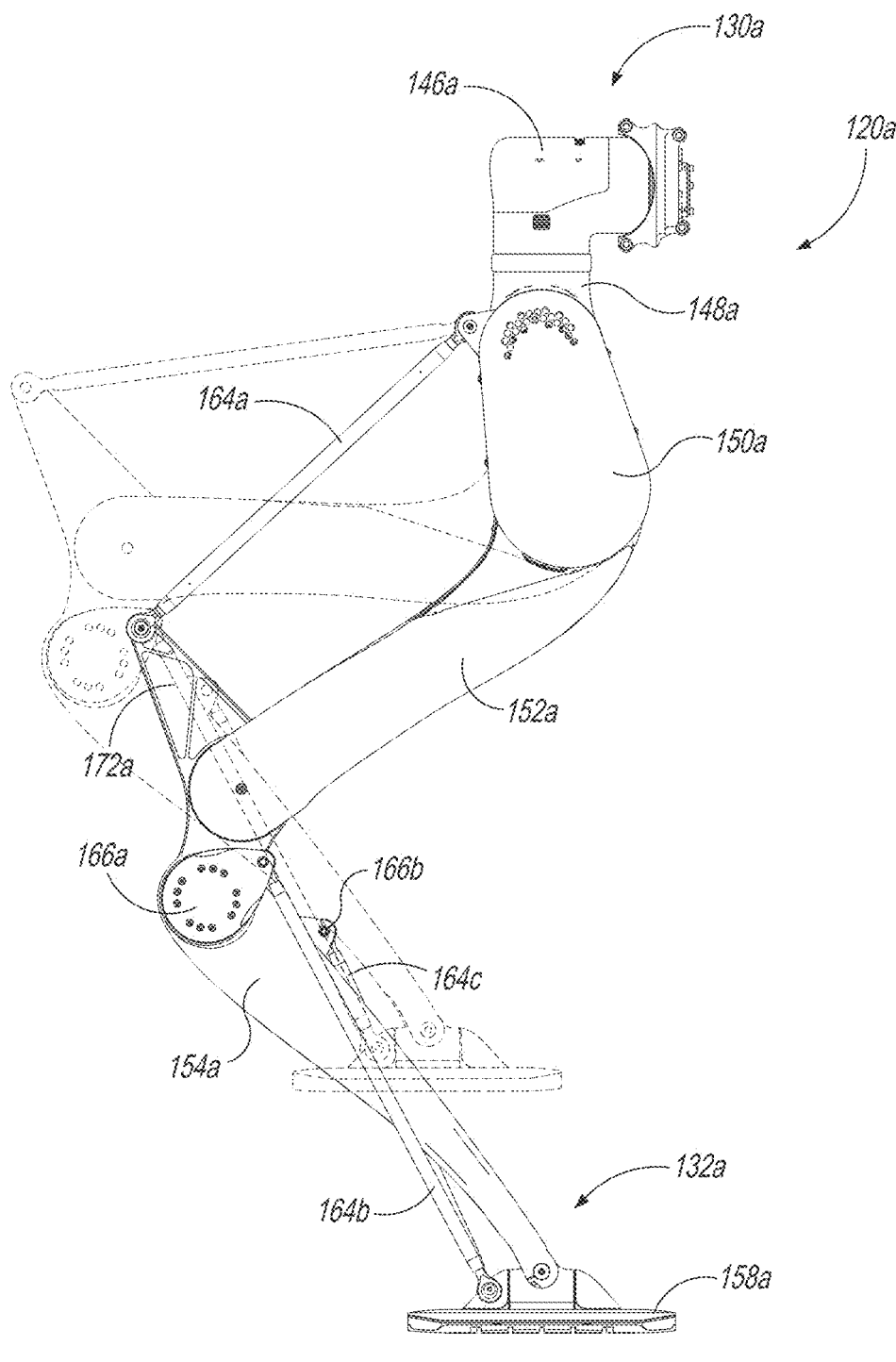
FIG. 31 is a side profile view of the first leg of the robot shown in FIG. 1 indicating isolated motion about two leg joints of the robot distal to the leg joint of FIG. 30 along the kinematic chain of FIG. 14.
Figures 32, 33:
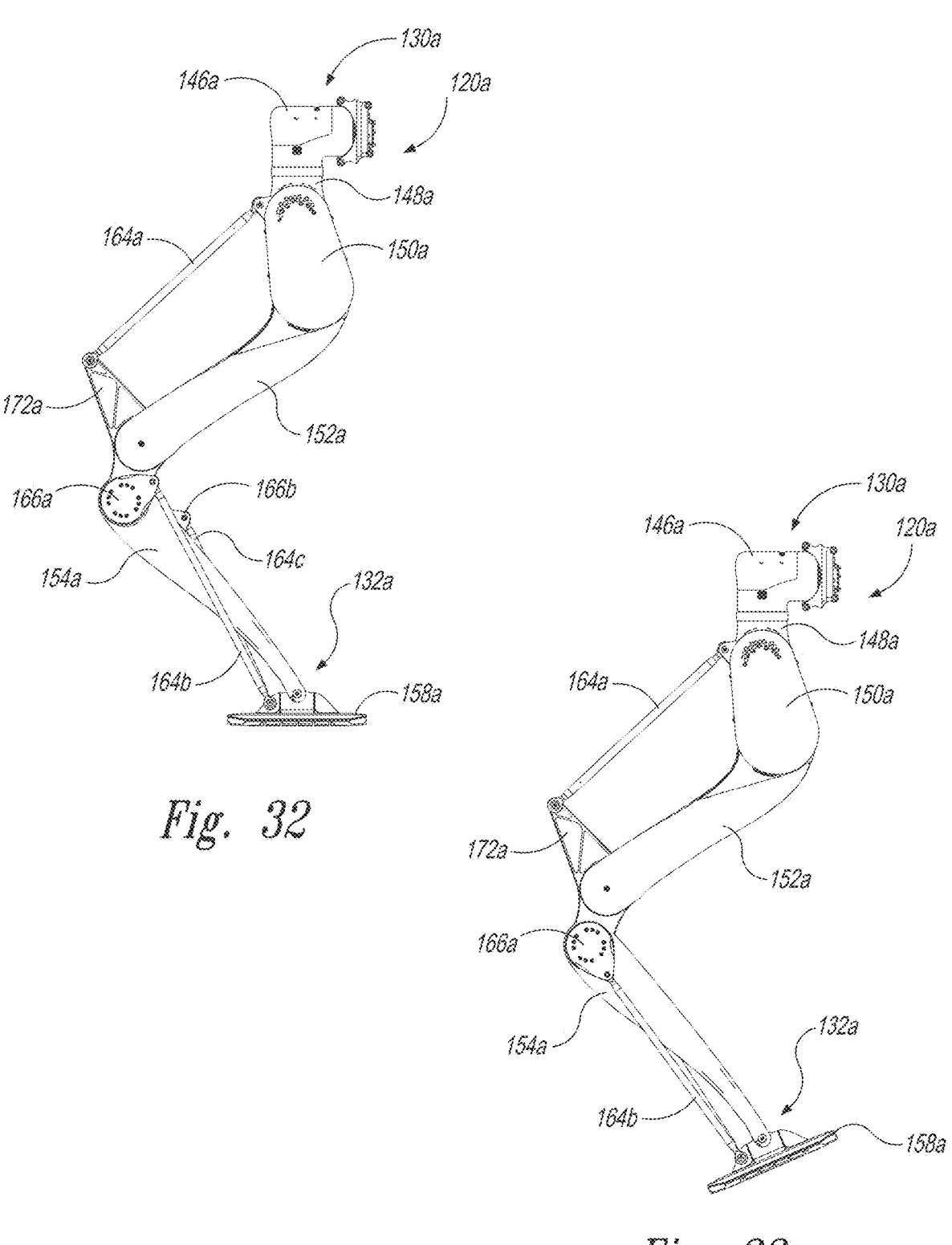
FIGS. 32 and 33 are side profile views of the first leg of the robot shown in FIG. 1 indicating isolated motion about a leg joint of the robot distal to the leg joints of FIG. 31 along the kinematic chain of FIG. 14.

FIGS. 28-30 are various views of the leg 120a indicating isolated motion about the proximal hip joint 162a, the distal hip joint 162b, and the proximal thigh joint 162c, respectively. FIG. 31 is a side profile view of the leg 120a indicating isolated motion about both the distal thigh joint 162d and the calf joint 162e. FIGS. 32 and 33 are side profile views of the leg 120a indicating isolated motion about the foot joint 162f. Motion about the leg joints 162g-162l of the leg 120b can correspond symmetrically about the midsagittal plane 102 (FIG. 3) to the motion about the leg joints 162a-160f of the leg 120a shown in FIGS. 28-33. In at least some cases, the proximal hip joints 162a, 162g and the distal hip joints 162b, 162h are configured to rotate about respective axes parallel to the corresponding leg lengths 128a, 128b. In these and other cases, proximal thigh joints 162c, 162i, the distal thigh joints 162d, 162j, the calf joints 162e, 162k, and the foot joints 162f, 162l can be configured to rotate about respective axes off-parallel to (e.g., within 10 degrees of perpendicular to, within 5 degrees of perpendicular to and/or substantially perpendicular to) the corresponding leg lengths 128a, 128b.

Examples of Electrical and Computer Systems

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLU-ETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the electrical and computer system 177 can include sensor components 189 for capturing, providing, and/or analyzing information about the robot 100 itself and/or the environment in which the robot 100 is operating.

The sensor components 189 can include the sensor arrays 117 discussed above. At the sensor arrays 117 or at one or more other suitable locations, the robot 100 can include among the sensor components 189 a light sensor (e.g., a photoresistor), a sound sensor (e.g., a microphone), an accelerometer, a gyroscope, a tilt sensor, a location sensor (e.g., using the Global Positioning System), a distance sensor, a contact sensor, and/or a proximity sensor, among other examples. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Examples of Light Sensors

Figure 35:
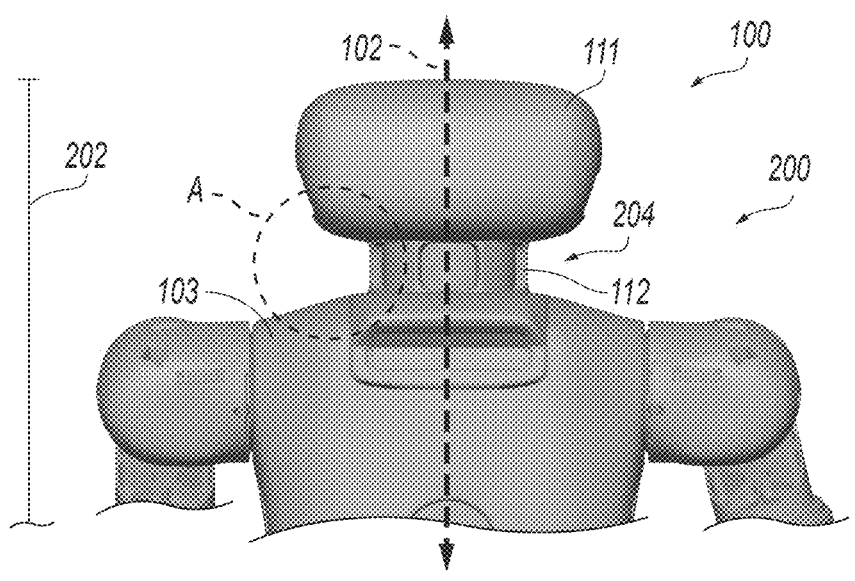
FIGS. 35 and 36 are, respectively, a front profile view and a side profile view of a neck region of the robot shown in FIG. 1.
Figure 36:
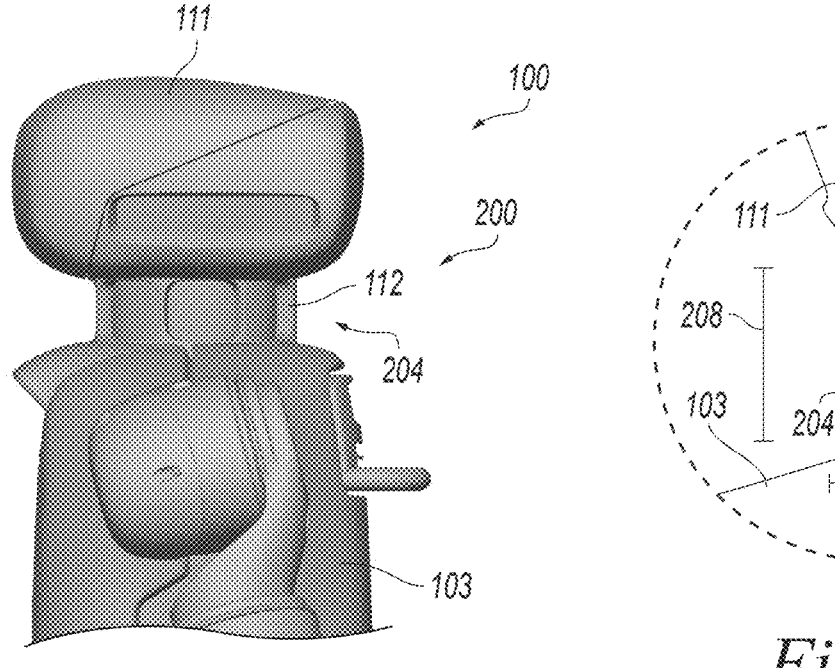

FIGS. 35 and 36 are, respectively, a front profile view and a side profile view of a neck region 200 of the robot 100. As shown in FIGS. 35 and 36, the robot 100 can define a robot height 202 parallel to the midsagittal plane 102. The neck 112 can extend between the head 111 and the body 103 along the robot height 202. The body 103 can superiorly carry the head 111 via the neck 112. At the neck region 200, the robot 100 can define a recess 204 radially adjacent to the neck 112, inferiorly adjacent to a neighboring portion of the head 111, and superiorly adjacent to a neighboring portion of the body 103. In the illustrated embodiment, the recess 204 is annular. For example, the recess 204 can be continuous and centered on a circular path perpendicular to the robot height 202. In other embodiments, a counterpart of the recess 204 can have one or more straight sides (e.g., be polygonal rather than circular), be less than fully circumferential, be centered on a path off-perpendicular to the robot height 202, and/or have one or more other differences relative to the illustrated embodiment.

Figure 37:
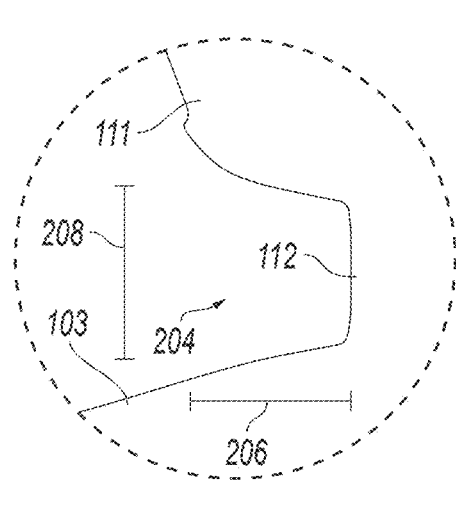
FIG. 37 is a simplified profile view corresponding to portion A of FIG. 35.

FIG. 37 is a simplified profile view corresponding to portion A of FIG. 35. With reference to FIGS. 35-37 together, the recess 204 can define a recess depth 206 perpendicular to the robot height 202 and a recess height 208 parallel to the robot height 202. In at least some cases, an average of the recess height 208 throughout the recess 204 is within a range from 50% to 200% of an average of the recess depth 206 throughout the recess 204. In these and other cases, the neck 112 can be recessed at least 1 centimeter (e.g., at least 2 centimeters) relative to the neighboring portion of the head 111 and relative to the neighboring portion of the body 103. This relationship can be present along all or a portion (e.g., at least 50% and/or at least 75%) of a perimeter of the neck 112 in a plane perpendicular to the robot height 202.

In the illustrated case, the neck 112 is readily distinguishable from the head 111 and from the body 103. In other cases, a counterpart of the neck 112 can be less well defined. For example, counterparts of the head 111, the neck 112, and the body 103 can define multiple and/or irregularly shaped insets corresponding to the neck region 200. In these and other cases, a counterpart of the neck 112 can extend along a given 5 centimeters of the robot height 202. A counterpart of the neighboring portion of the head 111 that defines a superior extent of a counterpart of the recess 204 can extend along a neighboring 10 centimeters of the robot height 202 superiorly adjacent to the given 5 centimeters. Similarly, a counterpart of the neighboring portion of the body 103 that defines an inferior extent of the counterpart of the recess 204 can extend along a neighboring 10 centimeters of the robot height 202 inferiorly adjacent to the given 5 centimeters. Features of the neck 112 and the recess 204 can apply to a counterpart of the neck 112 and to a counterpart of the recess 204 defined accordingly in relation to the robot height 202 rather than by more readily discernible shape features.

Figure 38:
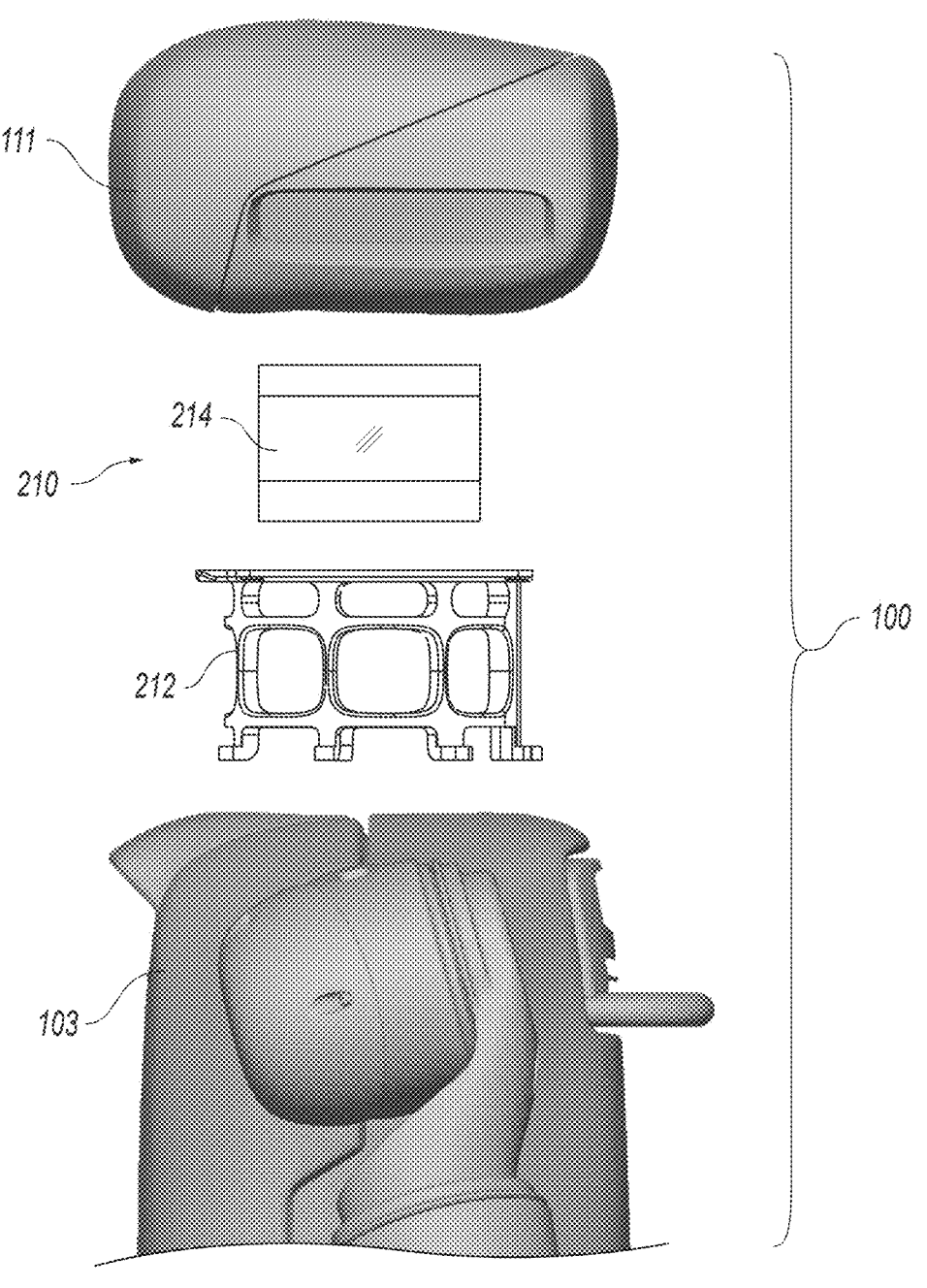
FIG. 38 is an exploded side profile view of the neck region of the robot shown in FIG. 1.

FIG. 38 is an exploded side profile view of the neck region 200. As shown in FIG. 38, the robot 100 can include a light sensor 210 and a structural neck frame 212 at the neck 112. The head 111 can be structurally connected to the body 103 at least primarily via the structural neck frame 212. The light sensor 210 can be disposed at least partially within the structural neck frame 212. In at least some cases, the structural neck frame 212 is at a periphery of the neck 112 in a plane perpendicular to the robot height 202. In these and other cases, the light sensor 210 can be cylindrical (e.g., puck shaped). As part of the light sensor 210, the robot 100 can include an optically transmissive shield 214 through which the light sensor 210 is configured to receive light. When the light sensor 210 is a lidar sensor and in other cases, the light sensor 210 can both receive and transmit light via the optically transmissive shield 214. The optically transmissive shield 214 can be inset relative to the structural neck frame 212 in a plane perpendicular to the robot height 202. Furthermore, the optically transmissive shield 214 can be annular in a plane perpendicular to the robot height 202. For example, the optically transmissive shield 214 can be continuous and centered on a circular path perpendicular to the robot height 202. In other cases, a counterpart of the optically transmissive shield 214 can have one or more straight sides (e.g., be polygonal rather than circular), be less than fully circumferential, be centered on a path off perpendicular to the robot height 202, and/or have one or more other differences relative to the illustrated case.

Figure 39:
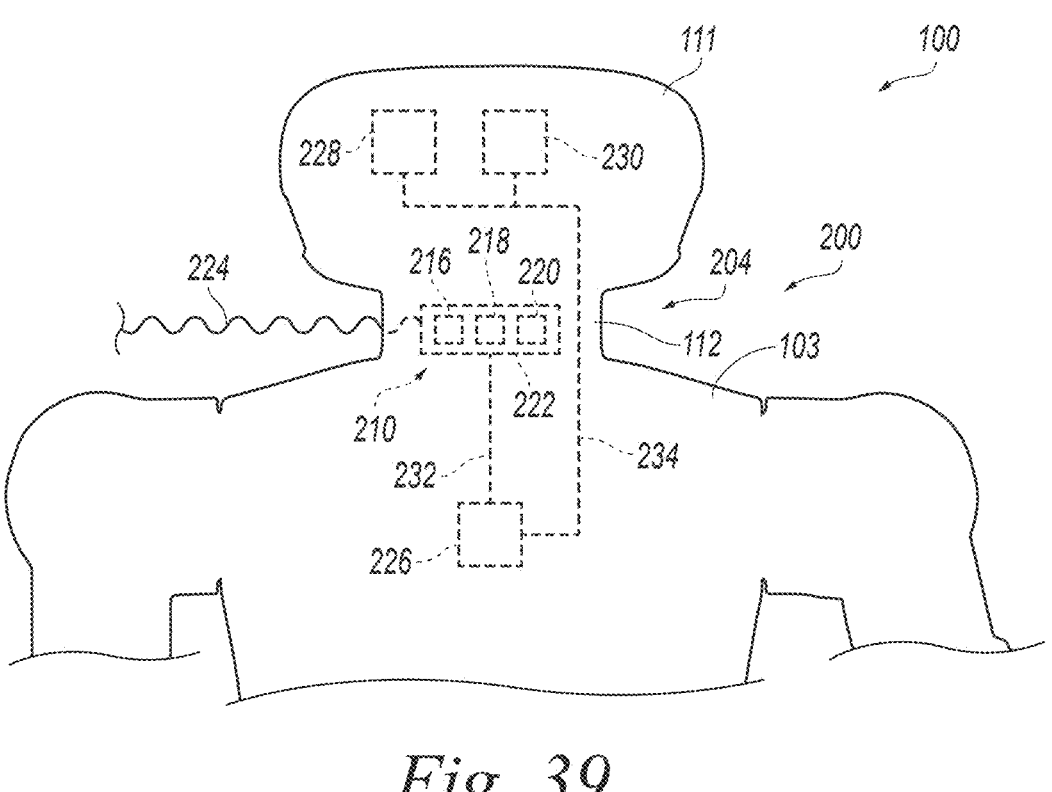
FIG. 39 is a partially schematic front profile silhouette view of the neck region of the robot shown in FIG. 1 illustrating a light sensor and associated internal features of the robot.

FIG. 39 is a partially schematic front profile silhouette view of the neck region 200. As shown in FIG. 39, the light sensor 210 can include a laser 216, a detector 218, and a processor 220 operably associated with one another within a shell 222. Line 224 in FIG. 39 represents received light, transmitted light, or both. In at least some cases, the light sensor 210 both transmits and receives light. Furthermore, the received light at the detector 218 can include a reflection of transmitted light from the laser 216. This can be the case, for example, when the light sensor 210 is a lidar sensor. In other cases, a counterpart of the light sensor 210 can receive light without also transmitting light. For example, a counterpart of the light sensor 210 can be a camera or a set of cameras. Examples of suitable camera configurations include stereo cameras, circumferentially distributed arrays of cameras, and movable (e.g., rotatable, track-mounted, etc.) cameras. Features of the detector 218 described herein can apply to a camera in counterparts of the light sensor 210. With reference again to FIG. 39, the robot 100 can further include a power source 226 at the body 103, an electronic display 228 at the head 111, and a head sensor 230 also at the head 111. The light sensor 210 and the head sensor 230 can be among the sensor components 189 described above. The power source 226 and the electronic display 228 can correspond, respectively, to the battery 187 and the display 113 described above. The robot 100 can further include a first electrical connector 232 through which the light sensor 210 is connected to the power source 226. The robot 100 can also include a second electrical connector 234 through which the electronic display 228 and the head sensor 230 are connected to the power source 226. The second electrical connector 234 can extend between the head 111 and the body 103 via the neck 112.

Figure 40:
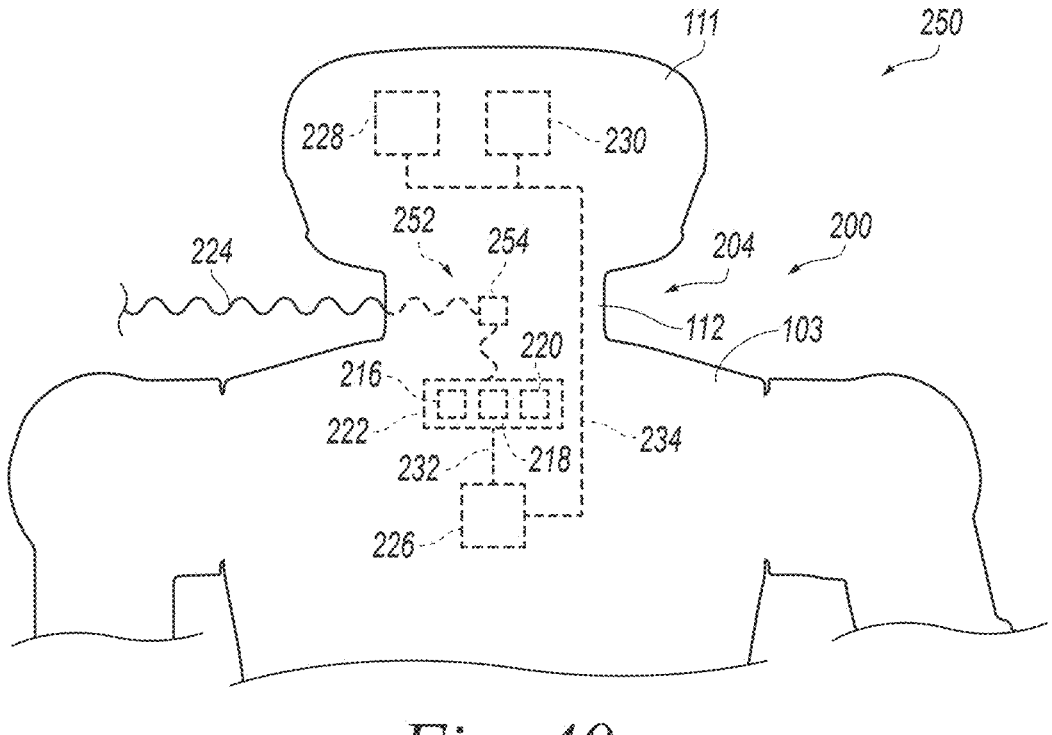
FIGS. 40 and 41 are partially schematic front profile silhouette views of neck regions of robots in accordance with at least some embodiments of the present technology illustrating other configurations of light sensors and associated internal features of the robots.
Figure 41:
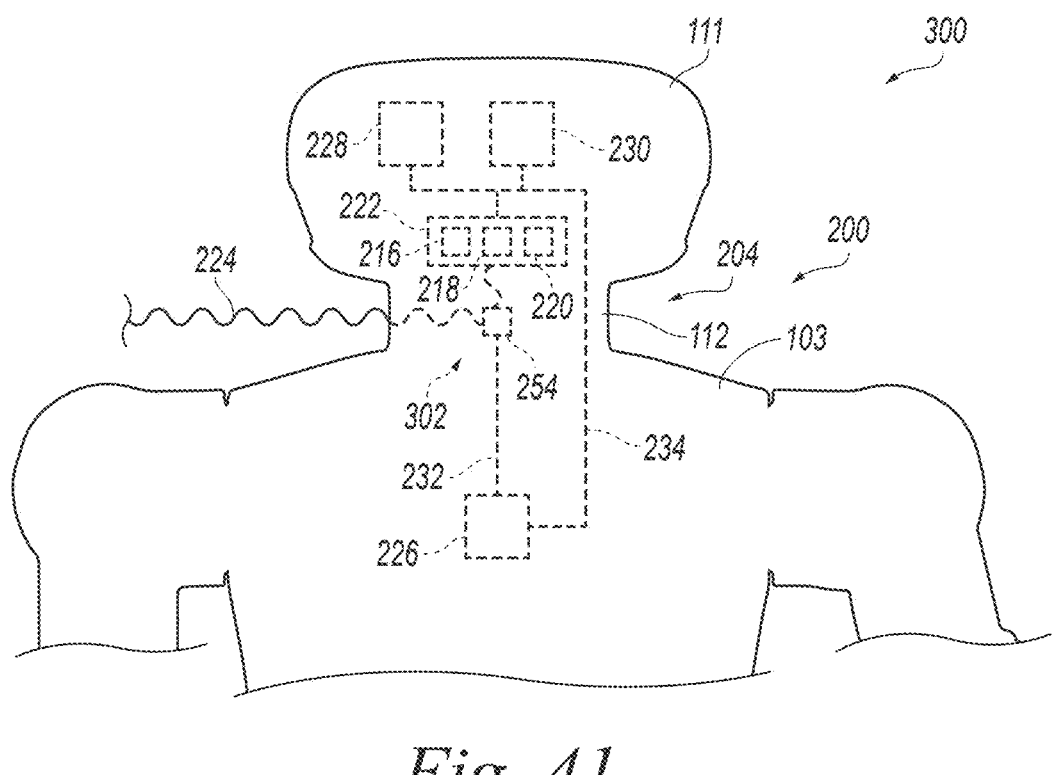

In the illustrated case, the light sensor 210 is self-contained aside from its connection to the power source 226. Furthermore, the laser 216, the detector 218, the processor 220, and the shell 222 are all at the neck 112. In other cases, a counterpart of the light sensor 210 can be at least partially distributed. In addition or alternatively, a counterpart of the light sensor 210 can include one or more components outside the neck 112. FIGS. 40 and 41 are partially schematic front profile silhouette views of neck regions of robots in accordance with at least some embodiments of the present technology illustrating other configurations of light sensors and associated internal features of the robots. As shown in FIG. 40, a robot 250 can include a light sensor 252 including a beam manipulator 254 (e.g., a mirror or prism) at the neck 112. The light sensor 252 can further include a laser 216, a detector 218, a processor 220, and a shell 222 as discussed above for the robot 100, but at the body 103 rather than at the neck 112. The beam manipulator 254 can redirect outgoing light from the laser 216 radially outward from the neck 112 and/or redirect incoming light at the neck 112 toward the detector 218. As shown in FIG. 41, a robot 300 can include a light sensor 302 similarly including the beam manipulator 254 at the neck 112. The light sensor 302 can further include a laser 216, a detector 218, a processor 220, and a shell 222 as discussed above for the robot 100, but at the head 111 rather than at the neck 112. With reference to FIGS. 39-41, the light sensors 210, 252, 302 can be configured to receive light via the neck 112. In the case of light sensor 210, the received light can be incident on the detector 218 directly. In the case of the light sensors 252, 302, the received light can reach the detectors 218 via the beam manipulators 254. In these and other cases, the received light can include a reflection of light transmitted from the lasers 216.

Figures 42, 43:
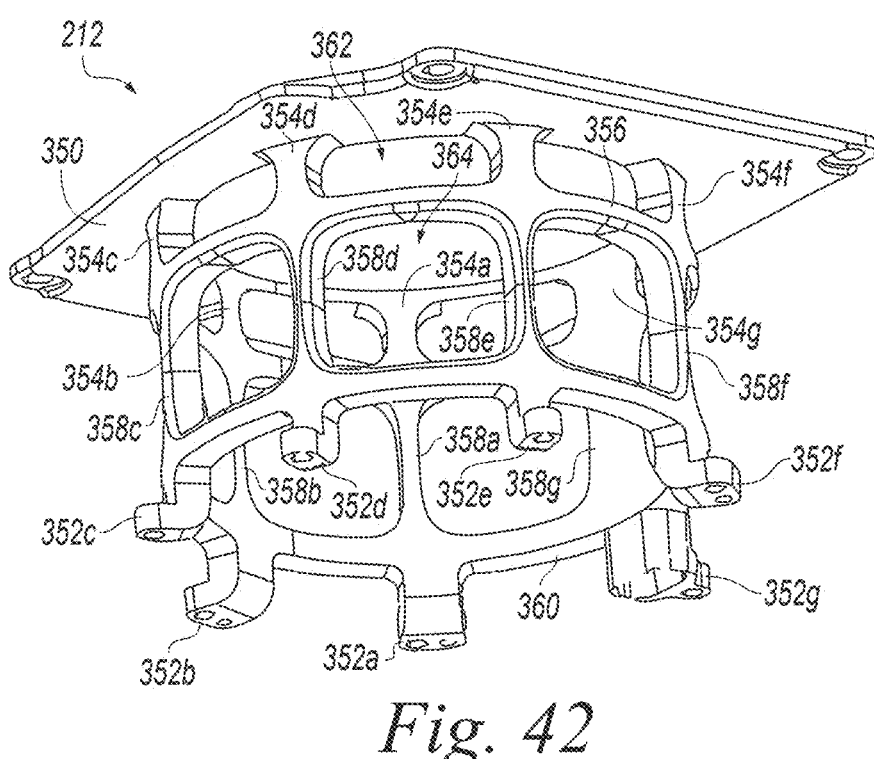
FIGS. 42 and 43 are a perspective view and a front profile view, respectively, of a structural neck frame of the robot shown in FIG. 1.
Figure 44:
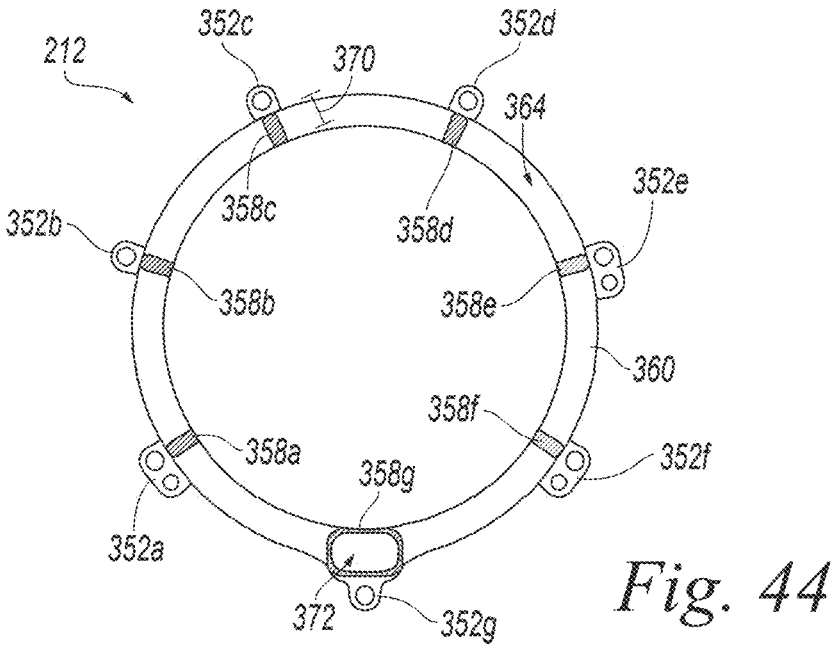
FIG. 44 is a cross-sectional view of the structural neck frame of the robot shown in FIG. 1 taken along the line B-B in FIG. 43.
Figure 45:
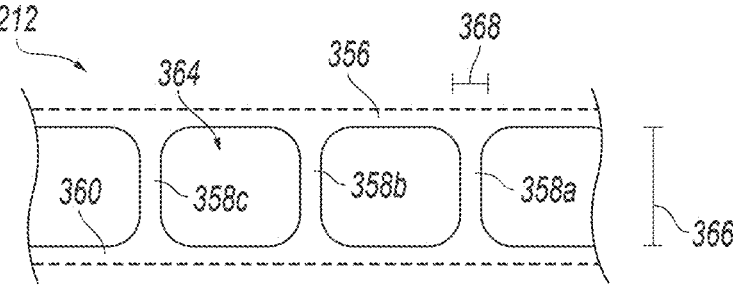
FIG. 45 is a flattened view of a portion of the structural neck frame of the robot shown in FIG. 1 illustrating a configuration of struts of the structural neck frame.

FIGS. 42 and 43 are a perspective view and a front profile view, respectively, of the structural neck frame 212 in isolation. FIG. 44 is a cross-sectional view of the structural neck frame 212 taken along the line B-B in FIG. 43. FIG. 45 is a flattened view of a portion of the structural neck frame 212. With reference to FIGS. 35 and 42-45 together, the structural neck frame 212 can include a platform 350 through which the structural neck frame 212 is configured to be connected to the head 111. The structural neck frame 212 can further include brackets 352 (individually identified as brackets 352a-352g) through which the structural neck frame 212 is configured to be connected to the body 103. The structural neck frame 212 can still further include pillars 354 (individually identified as pillars 354a-354g) inferiorly adjacent to the platform 350, a first collar 356 inferiorly adjacent to the pillars 354, struts 358 (individually identified as struts 358a-358g) inferiorly adjacent to the first collar 356, and a second collar 360 inferiorly adjacent to the struts 358 and superiorly adjacent to the brackets 352. The platform 350, the pillars 354, and the first collar 356 can define openings 362 (one labeled) distributed around the periphery of the neck 112 in a plane perpendicular to the robot height 202. Similarly, the first collar 356, the struts 358, and the second collar 360 can define windows 364 (one labeled) distributed around the periphery of the neck 112 in another plane perpendicular to the robot height 202.

The struts 358a-358g can define a strut length 366 parallel to the robot height 202, a strut width 368 perpendicular to the strut length 366, and a strut depth 370 perpendicular to the strut length 366 and perpendicular to the strut width 368. The struts 358a-358g can extend longitudinally along the strut length 366 between the head 111 and the body 103 and can extend radially along the strut depth 370 relative to the robot height 202 in the plane perpendicular to the robot height 202. The struts 358a-358g can be configured to provide robust structural support for the head 111 without unduly obstructing a field of view of the light sensor 210. The light sensor 210 can be configured to receive light via the windows 364. A field of view of the light sensor 210 can extend at least 180 degrees (e.g., at least 240 degrees, at least 320 degrees, and/or 360 degrees) around the neck 112 in a plane perpendicular to the robot height 202. In these and other cases, the struts 358 can obstruct no more than 10% (e.g., no more than 15% and/or no more than 5%) of the field of view of the light sensor 210 in the plane perpendicular to the robot height 202. To reduce obstruction without unduly compromising strength and/or for one or more other reasons, the strut depth 370 can be relatively large. For example, an average of the strut width 368 throughout the strut length 366 can be at most 50% of (e.g., at most 75% of and/or less than) an average of the strut depth 370 throughout the strut length 366. This can be the case for one, some, most, or all of the struts 358a-358g.

As shown in FIG. 44, the strut 358g can be larger than the other struts 358a-358f. Furthermore, the strut 358g can define an internal channel 372 extending between the head 111 and the neck 112. The second electrical connector 234 (FIG. 39) can extend between the head 111 and the body 103 via the internal channel 372. In the same way, other connectors (electrical, mechanical, pneumatic, etc.) can extend between the head 111 and the body 103. Routing such connectors through the internal channel 372 and locating the struts 358 at a periphery of the neck 112 can be useful, for example, to maintain a central region of the neck 112 generally free of obstructions. This can facilitate location of the light sensor 210 at this central region. Given the challenge of achieving a circumferentially expansive field of view, off-the-shelf lidar sensors, for example, tend to be large and to be incompatible with internal through connections. In at least some cases, the strut 358g and the second electrical connector 234 are at a posterior periphery of the neck 112. This positioning can be advantageous for example, when posteriorly directed sensing by the light sensor 210 is less useful than anteriorly and laterally directed sensing by the light sensor 210 such that posterior occlusion of the field of view of the light sensor 210 is relatively inconsequential. In other cases, a counterpart of the strut 358g can be at another suitable portion of the neck 112. Furthermore, a counterpart of the strut 358g can be the same size as the other struts 358a-358f. In these and other cases, counterparts of the second electrical connector 234 can extend through more than one of the struts 358a-358g.

Figure 46:
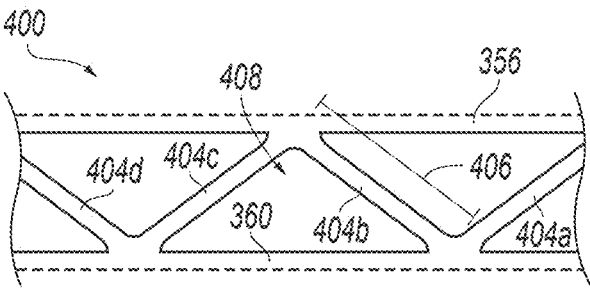
FIG. 46 is a flattened view of a portion of a structural neck frame of a robot in accordance with at least some embodiments of the present technology illustrating another configuration of struts of the structural neck frame.

With reference again to the illustrated case, the strut lengths 366 can be parallel to the robot height 202. Alternatively, counterparts of one, some, or all of the struts 358a-358g can have strut lengths off parallel to the robot height 202. FIG. 46 is a flattened view of a portion of a structural neck frame 400 similar to the structural neck frame 212, but having struts 404 (individually identified as struts 404a-404d) with strut lengths 406 (one labeled) extending diagonally from the first collar 356 to the second collar 360. The strut lengths 406 can extend in alternating circumferential directions such that the first collar 356, the second collar 360, and the struts 404 define triangular windows 408. This configuration of the struts 404 can be stronger than the configuration of the struts 358 (FIG. 45) against at least some loads. The configuration of the struts 404 can also be more obstructing to a field of view of the light sensor 210 than the configuration of the struts 358 (FIG. 45). Accordingly, a configuration of struts in counterparts of the structural neck frame 212, 400 can be selected based on whether strength or occlusion are of greater significance. Moreover, the strut configurations can be different at different circumferential positions. For example, a counterpart of the structural neck frames 212, 400 can resemble the structural neck frame 212 anteriorly and can resemble the structural neck frame 400 posteriorly.

Figure 47:
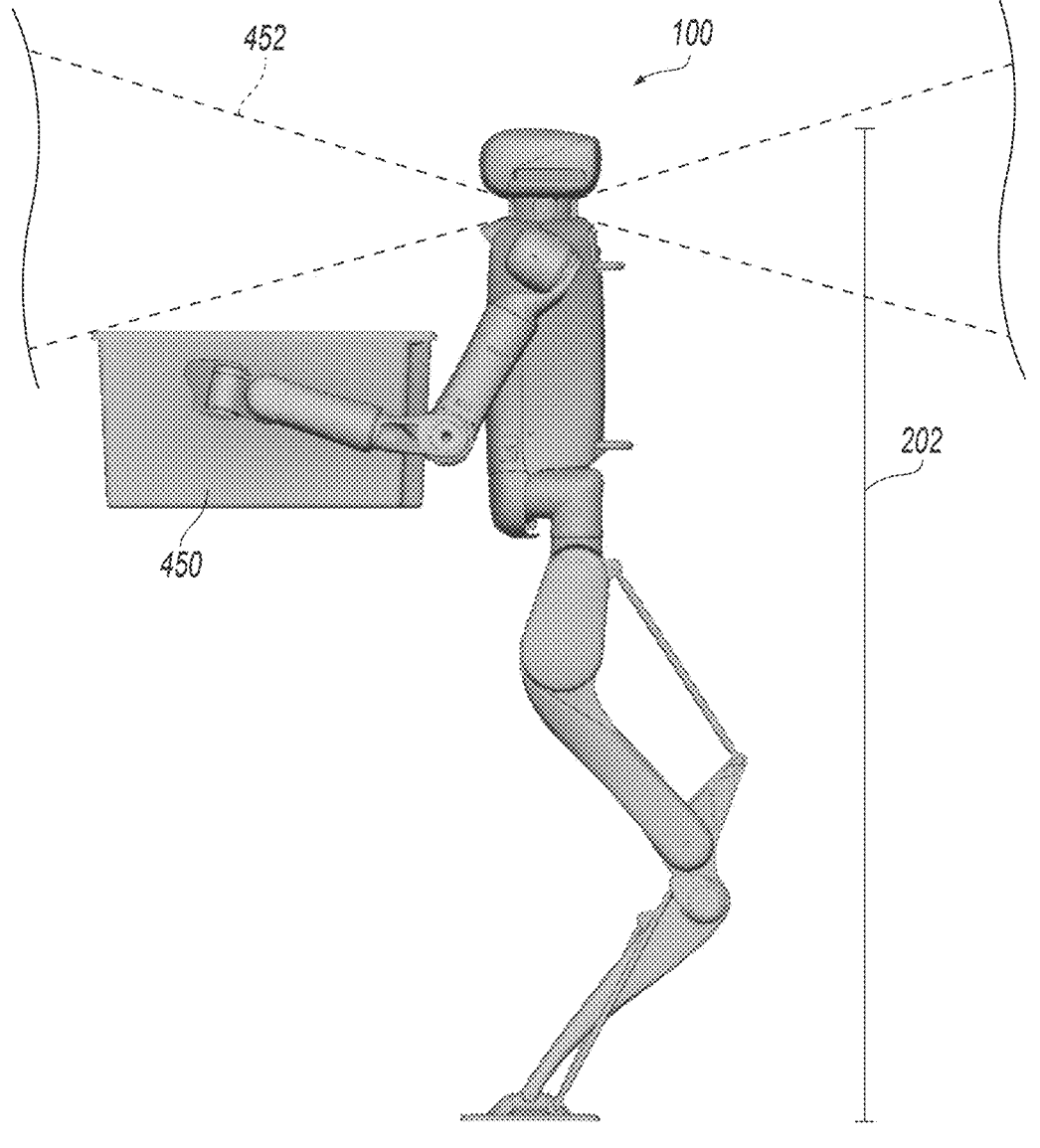
FIGS. 47 and 48 are a side profile view and a front profile view, respectively, the robot shown in FIG. 1 handling a tote.
Figure 48:
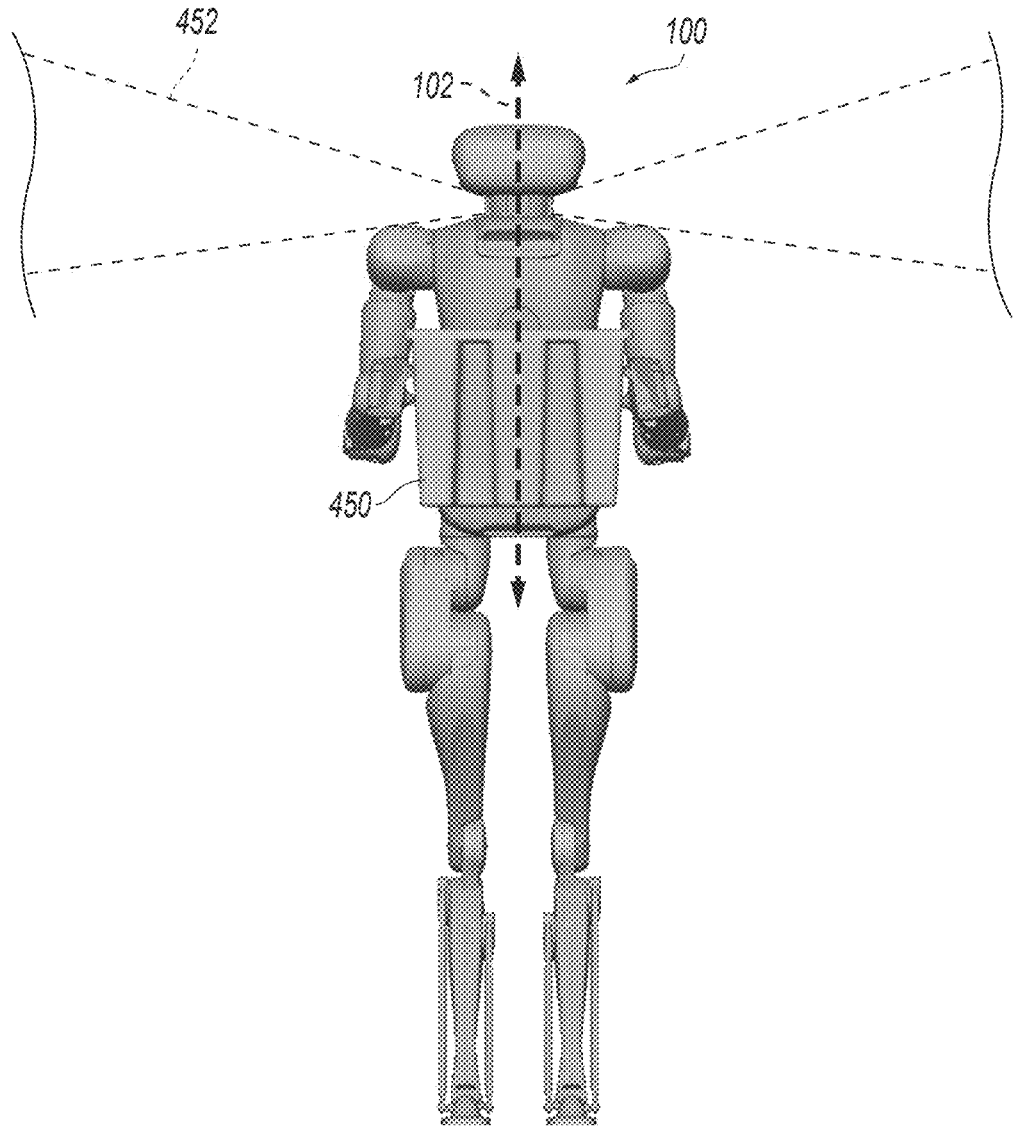

FIGS. 47 and 48 are a side profile view and a front profile view, respectively, the robot 100 and features associated with operation of the light sensor 210. In FIGS. 47 and 48, the robot 100 is shown manipulating a tote 450. FIGS. 47 and 48 also show a field of view 452 of the light sensor 210. As shown in FIGS. 47 and 48, the field of view 452 can be conical at a given side of the robot 100 in a plane parallel to the robot height 202. The neighboring portions of the head 111 and the body 103 that slope inwardly toward the neck 112 can at least partially define a vertical extent of the field of view 452. With the tote 450 at an advantageous working height, the field of view 452 can be well suited to detecting distant objects while excluding most or all of the tote 450.

In at least some cases, outwardly facing surfaces of the inwardly sloping portions of the head 111 and the body 103 neighboring the neck 112 are configured to absorb light that might otherwise reflect toward the detector 218 unproductively. Similarly, inwardly facing surfaces of the structural neck frame 212 (e.g., at the struts 304) can be configured to absorb light that might otherwise reflect toward the detector 218 unproductively. The absorbed light can be ambient light outside the desired field of view 452, such as with respect to the outwardly facing surfaces of the inwardly sloping portions of the head 111 and the body 103 neighboring the neck 112. The absorbed light can also be light from the laser 216, such as with respect to the outwardly facing surfaces of the inwardly sloping portions of the head 111 and the body 103 neighboring the neck 112 and with respect to the inwardly facing surfaces of the structural neck frame 212. Accordingly, the outwardly facing surfaces of the inwardly sloping portions of the head 111 and the body 103 neighboring the neck 112 and the inwardly facing surfaces of the structural neck frame 212 can be configured to absorb light at a wavelength at which the laser 216 transmits light. Furthermore, these surfaces can be more generally light absorptive, such as by being anodized or being otherwise coated with a generally light absorptive material. In the foregoing and/or another suitable manner, the head 111, the body 103, and the structural neck frame 212 can be configured to reduce noise and thereby improve performance of the light sensor 210.

Examples of Sensing Methods

Figure 49:
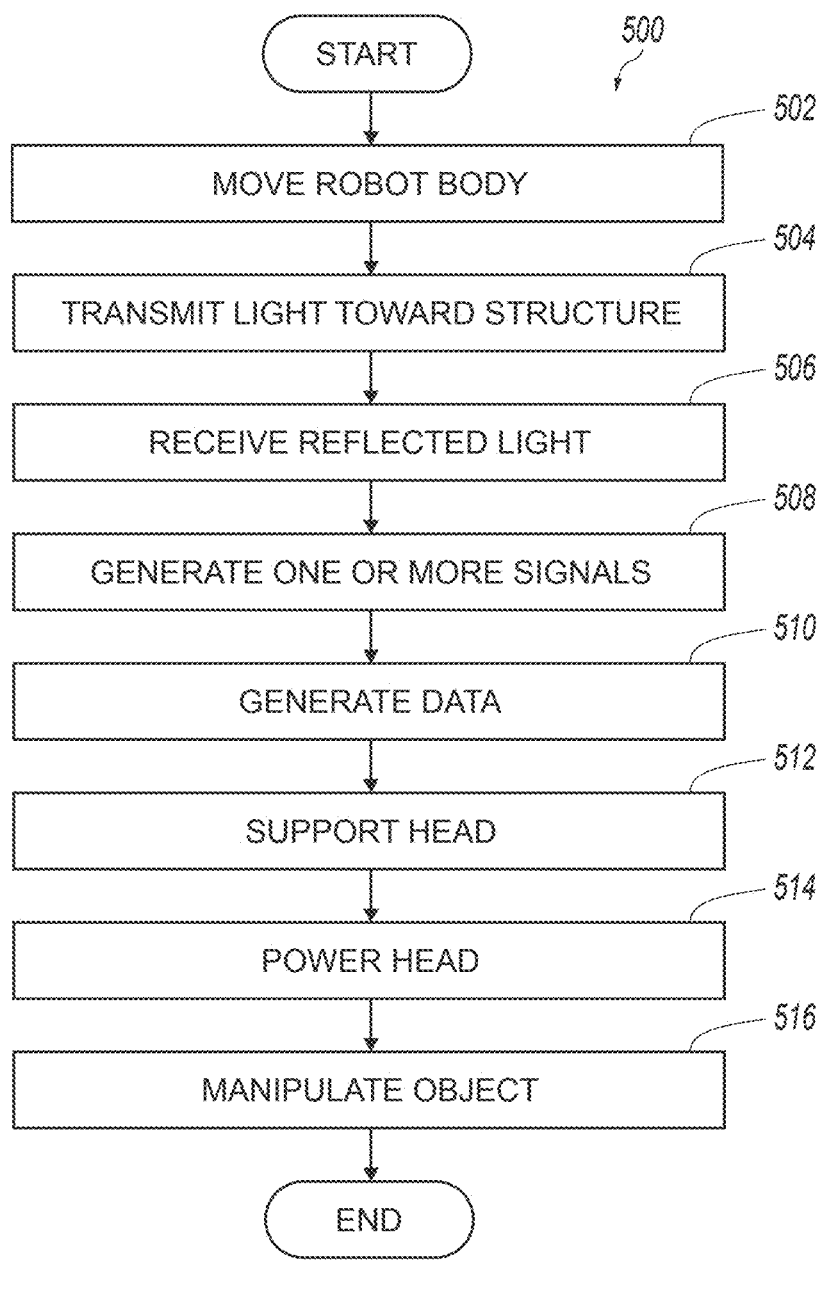
FIG. 49 is a block diagram corresponding to a method in accordance with at least some embodiments of the present technology.

FIG. 49 is a block diagram corresponding to a method 500 in accordance with at least some embodiments of the present technology. With reference to FIGS. 35-49 together, the method 500 can include moving the body 103 via the legs 120a, 120b (e.g., bipedally) along a ground surface of a working environment (block 502). The method 500 can further include sweeping light transmitting light from the laser 216 toward a structure within the working environment via the annular recess 204 (block 504). This transmitting can occur in connection with sweeping, scanning, dithering, etc. the light within a field of view. The method 500 can also include receiving, via the annular recess 204, light at the light sensor 210 (block 506). This transmitting and receiving of light can occur while moving the body 103 along the ground surface. In at least some cases, the received light includes a reflection of the transmitted light. Furthermore, the received light can be received via a field of view of the light sensor 210 extending at least 180 degrees (e.g., at least 240 degrees, at least 320 degrees, and/or 360 degrees) around the neck 112 in a plane parallel to the ground surface while moving the body 103 along the ground surface. The method 500 can further include generating, via the light sensor 210, one or more signals corresponding to the received light (block 508). Using the processor 220 and/or another computer operably associated with the robot 100, the method 500 can further include generating data based at least partially on the one or more signals (block 510). In at least some cases, the data includes point-cloud data. In these and other cases, the data can correspond to respective positions of structures within the working environment.

During operation of the light sensor 210 and/or at other times, the method 500 can include structurally supporting the head 111 at least primarily via the structural neck frame 212 (block 512). The method 500 can also include powering the head 111 (block 514). This can include, for example, providing power to the electronic display 228 via the power source 226, the second electrical connector 234, the strut 358g, and the internal channel 372. With power supplied in this or another suitable manner, the method 500 can include operating the electronic display 228 and/or other power-consuming features of the head 111. Finally, the method 500 can include manipulating an object via the arms 118a, 118b (block 516). In at least some cases, this manipulation occurs while the object and the arms 118a, 118b are entirely within a manipulation region below the annular recess 204.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of the robot 100 and in the absence of a statement to the contrary, such terms refer to the robot 100 in the first state shown in FIGS. 1-3. Furthermore, terms corresponding to anatomical parts (e.g., "wrist," "elbow," "hip," "thigh," "calf," "torso," etc.) may be assigned arbitrarily and are intended to be interpreted in the context of the described embodiments rather than in the context of a human. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A robot defining a robot height and comprising:
a body;
legs connected to the body, wherein the robot is configured to ambulate via at least two of the legs;
a head carried by the body;
a neck extending between the head and the body along the robot height, wherein the neck is recessed relative to a neighboring portion of the head and relative to a neighboring portion of the body along at least 50% of a perimeter of the neck in a plane perpendicular to the robot height;
a sensor configured to receive light from sources external to the neck via the neck; and
a structural neck frame at a periphery of the neck in the plane perpendicular to the robot height, wherein the sensor is disposed within the structural neck frame.

2. The robot of claim 1, wherein the neck is recessed at least 1 centimeter relative to the neighboring portion of the head and relative to the neighboring portion of the body along at least 50% of the perimeter of the neck in the plane perpendicular to the robot height.

3. The robot of claim 1, wherein a field of view of the sensor extends at least 180 degrees around the neck in the plane perpendicular to the robot height.

4. The robot of claim 1, wherein the sensor is a lidar sensor.

5. The robot of claim 1, wherein the sensor is a camera.

6. The robot of claim 1, wherein:
the sensor includes a laser configured to transmit light via the neck; and
the sensor is configured to receive, via the neck, a reflection of the light transmitted from the laser.

7. The robot of claim 6, wherein:
the laser is configured to transmit light via the neck at a given wavelength;
the neighboring portions of the head and the body slope inwardly toward the neck; and
the neighboring portions of the head and the body are configured to absorb light at the given wavelength.

8. The robot of claim 1, wherein:
the neck is recessed at least 1 centimeter relative to the neighboring portion of the head and relative to the neighboring portion of the body along at least 50% of the perimeter of the neck in any plane perpendicular to the robot height along a given 5 centimeters of the robot height;
the neighboring portion of the head is a neighboring 10 centimeters of the head along the robot height superiorly adjacent to the given 5 centimeters; and
the neighboring portion of the body is a neighboring 10 centimeters of the body along the robot height inferiorly adjacent to the given 5 centimeters.

9. The robot of claim 8, wherein:
the robot defines an annular recess adjacent to the neck, the neighboring portion of the head, and the neighboring portion of the body;
the annular recess defines a recess depth perpendicular to the robot height and a recess height parallel to the robot height; and
an average of the recess height throughout the annular recess is within a range from 50% to 200% of an average of the recess depth throughout the annular recess.

10. The robot of claim 1, wherein:
the body includes a torso having a superior portion, an inferior portion, and an intermediate portion therebetween;
the legs are connected to the torso via the inferior portion of the torso; and
the neck is connected to the torso via the superior portion of the torso.

11. The robot of claim 10, further comprising arms connected to the torso via the superior portion of the torso.

12. The robot of claim 1, further comprising an electrical connector extending between the head and the body via the neck.

13. The robot of claim 12, further comprising:

an electronic display at the head; and a power source at the body, wherein the electronic display is operably connected to the power source via the electrical connector.

14. The robot of claim 12, wherein the electrical connector is at a posterior periphery of the neck.

15. The robot of claim 1, wherein the structural neck frame obstructs no more than 10% of a field of view of the sensor in the plane perpendicular to the robot height.

16. The robot of claim 1, wherein the head is structurally connected to the body at least primarily via the structural neck frame.

17. The robot of claim 1, further comprising an optically transmissive shield inset relative to the structural neck frame in the plane perpendicular to the robot height, wherein the sensor is configured to receive the light via the optically transmissive shield.

18. The robot of claim 1, wherein:

the structural neck frame includes struts individually defining a strut length and individually extending along the strut length between the head and the body;

the individual struts further define a strut width perpendicular to the strut length and a strut depth perpendicular to the strut length and perpendicular to the strut width, wherein the struts individually extend radially along the strut depth relative to the robot height in the plane perpendicular to the robot height; and for the struts individually, an average of the strut width throughout the strut length is no more than 50% of an average of the strut depth throughout the strut length.

19. The robot of claim 18, wherein, for the struts individually, the strut length is parallel to the robot height.

* * * * *